(12) United States Patent
Toyoshima et al.

(10) Patent No.: US 6,354,169 B1
(45) Date of Patent: Mar. 12, 2002

(54) LINK LEVER SYSTEM FOR VEHICLE AIR CONDITIONER

(75) Inventors: Takashi Toyoshima, Obu; Kazushi Shikata, Kariya; Kazutoshi Kuwayama, Nakashima-gun, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/538,312

(22) Filed: Mar. 30, 2000

(30) Foreign Application Priority Data

Mar. 31, 1999 (JP) ............................................ 11-092129
Sep. 28, 1999 (JP) ............................................ 11-274729
Jan. 21, 2000 (JP) ............................................ 12-017821

(51) Int. Cl.$^7$ .............................................. G05G 11/00
(52) U.S. Cl. ................. 74/490.15; 74/479.01; 74/490.14
(58) Field of Search ................. 74/479.01, 480 R, 74/480 B, 481, 482, 490.14, 490.15

(56) References Cited

U.S. PATENT DOCUMENTS 1,594,331 A * 7/1926 Henke .......................... 74/482
2,796,774 A * 6/1957 Peed, Jr. ....................... 74/522
3,316,773 A * 5/1967 Findlay ......................... 74/481

FOREIGN PATENT DOCUMENTS

JP           A-4-142116       5/1992

* cited by examiner

Primary Examiner—Allan D. Herrmann
(74) Attorney, Agent, or Firm—Harness, Dickey & Pierce, PLC

(57) ABSTRACT

In a vehicle air conditioner, inside air and outside air are switched by first and second inside/outside air switching doors. The first inside/outside air switching door is operated by a first door lever operatively linked with an inside/outside air operation member of an operation panel. On the other hand, the second inside/outside air switching door is operated by a second door lever which is operated by a mode operation lever operatively linked with a mode operation member of the operation panel, a temperature-adjustment operation lever operatively linked with a temperature-adjustment operation member of the operation panel, and an elastic force of a spring. When an air outlet mode except for a defroster mode is manually set by the mode operation member, and when maximum heating is manually set by the temperature-adjustment operation member, the second inside/outside air switching door is operated to an inside air introduction state by the second door lever.

8 Claims, 19 Drawing Sheets

FIG. 8

| OPERATION MEMBER 66 | MODE | | | | |
|---|---|---|---|---|---|
| | FACE | B/L | FOOT | F/D | DEF |
| (M, C) ↑ MIDDLE AREA ↓ (M, H) | CLOSING | CLOSING | CLOSING | CLOSING | CLOSING |
| | OPENING | | | | |

FIG. 10

| MODE / OPERATION MEMBER 64 | FACE | B/L | FOOT | F/D | DEF |
|---|---|---|---|---|---|
| INSIDE AIR POSITION | INSIDE AIR | INSIDE AIR | INSIDE AIR | INSIDE AIR | OUTSIDE AIR |
| OUTSIDE AIR POSITION | OUTSIDE AIR | OUTSIDE AIR | OUTSIDE AIR | OUTSIDE AIR | OUTSIDE AIR |

| OPRATION MEMBER 66 | MODE | | | | |
|---|---|---|---|---|---|
| | FACE | B/L | FOOT | F/D | DEF |
| (M, C) ↑ MIDDLE AREA ↓ (M, H) | OPENING | | | | CLOSING |
| | CLOSING | CLOSING | CLOSING | CLOSING | |
| | OPENING | | | | | ns of the input levers.
LINK LEVER SYSTEM FOR VEHICLE AIR CONDITIONER

CROSS-REFERENCE TO RELATED APPLICATION

This application is related to and claims priority from Japanese Patent Applications No. Hei. 11-92129 filed on Mar. 31, 1999, No. Hei. 11-274729 filed on Sep. 28, 1999, and No. 2000-17821 filed on Jan. 21, 2000, the contents of which are hereby incorporated by reference.

BACKGROUND OF THE INVENTION

1. Field of the Invention

The present invention relates to a link lever system which operates a single output lever by plural input levers manually operated, and relates to a vehicle air conditioner using the link lever system.

2. Description of Related Art

In a conventional vehicle air conditioner, for improving both heating performance for a lower side of a passenger compartment and defrosting performance of a windshield in the winter, an inside/outside air double layer flow mode (hereinafter, referred to as "double layer flow mode") is set so that inside air having a high temperature is blown from a foot opening and outside air having a low humidity is blown from a defroster opening. Further, the double layer flow mode is set when a maximum heating is set. Thus, it is necessary to set the double layer flow mode based on both operation conditions of an air outlet mode and a temperature adjustment unit. In the conventional air conditioner, an electronic control unit for determining a set condition of the double layer flow mode and a door driving motor for electrically controlling plural doors are provided, and the double layer flow mode is set by the door driving motor based on control signals of the electronic control unit. Thus, production cost of the vehicle air conditioner is increased.

SUMMARY OF THE INVENTION

In view of the foregoing problems, it is an object of the present invention to provide a link lever system which operates an output lever at a predetermined position when operation positions of plural input levers satisfy a predetermined condition.

It is an another object of the present invention to provide a vehicle air conditioner which can readily manually set a double layer flow mode.

According to a first aspect of the present invention, a link lever system includes a plurality of input levers which are respectively manually operated, an output lever operatively linked with the input levers, and a driven member connected to the output lever to be operated by the output lever. In the link lever system, the output lever is operated to a first predetermined position, when the input levers are operated to set operation positions satisfying a predetermined condition. Thus, the output lever is accurately displaced in accordance with displaced operation positions of the input levers.

Preferably, the output lever is operated to a second predetermined position while a displacement of the output lever due to an elastic force of an elastic member is prevented by first engagement means between a first input lever of the plural input levers and the output lever, when the first input lever is operated at an operation position different from the set operation position of the predetermined condition. Therefore, the output lever is accurately displaced to the first or second predetermined position in accordance with the operation positions of the input levers.

Further, the output lever is operated to the second predetermined position while a displacement of the output lever due to the elastic force of the elastic member is prevented by second engagement means between a second input lever of the plural input levers and the output lever, when the second input lever is operated at an operation position different from the set operation position of the predetermined condition. Therefore, when the second input lever is operated to a position different from the set operation position of the predetermined condition, the output lever is accurately maintained at the second predetermined position by the second engagement means regardless of the operation position of the first input lever.

Preferably, the link lever system is provided in a vehicle air conditioner including an air conditioning case for defining an air passage through which air flows into a passenger compartment, an inside/outside air switching door for switching inside air and outside air to be introduced into the air conditioning case, a mode operation member provided on an operation panel of the passenger compartment to be manually operated through which an air outlet mode for selecting an air flow direction in the passenger compartment is set, and a temperature-adjustment operation member provided on the operation panel to be manually operated through which temperature of air blown into the passenger compartment is adjusted. The first input lever of the link lever system is operatively linked with the mode operation member, the second input lever is operatively linked with the temperature-adjustment operation member, and the output lever operatively connected to the inside/outside air switching door is operated by operating the first and second input levers at operation positions. Thus, the inside/outside air switching door is operated to be switched in accordance with a manual set position of the mode operation member and a manual set position of the temperature-adjustment operation member.

According to a second aspect of the present invention, an air conditioner for a vehicle includes a case having a first opening through which air is blown toward a windshield and a second opening through which air is blown toward a lower side of a passenger compartment, a partition member for partitioning an air passage of the case into a first air passage communicating with the first opening and a second air passage communicating with the second opening during a double layer flow mode, a first inside/outside air switching door for switching inside air and outside air to be introduced into the first air passage, a second inside/outside air switching door for switching inside air and outside air to be introduced into the second air passage, a first door lever operatively connected to the first inside/outside air switching door, a second door lever operatively connected to the second inside/outside air switching door, an inside/outside air operation member disposed on an operation panel of the passenger compartment to be manually operated for switching inside air and outside air to be introduced, a mode operation member disposed on the operation panel to be manually operated for switching an air outlet mode for setting an air flow direction in the passenger compartment, a mode operation lever operatively linked with the mode operation member, a temperature-adjustment operation member disposed on the operation panel to be manually operated for adjusting temperature of air blown into the passenger compartment, and a temperature-adjustment operation lever operatively linked with the temperature-adjustment operation member. The first inside/outside air switching door is driven to be opened and closed based on a manual operation of the inside/outside air operation member through the first door lever, and the second door lever is operated through the mode operation lever and the temperature-adjustment operation lever based on manual operations of the mode operation member and the temperature-adjustment operation member, to operate the second inside/outside air switching door. Thus, it is possible to set the first door lever at an outside air introduction position of the first inside/outside air switching door by a manual operation of the inside/outside air operation member, while it is possible to set the second door lever at an inside air introduction position of the second inside/outside air switching door by combining manual operations of the mode operation member and the temperature-adjustment operation member through the mode operation lever and the temperature-adjustment operation lever. As a result, in the vehicle air conditioner, a double layer flow mode is readily manually set.

According to a third aspect of the present invention, a vehicle air conditioner includes an inside/outside air switching door for switching inside air and outside air to be introduced into an air passage, an inside/outside air operation member disposed on an operation panel of the passenger compartment to be manually operated for switching inside air and outside air to be introduced into the air passage, a mode operation member disposed on the operation panel to be manually operated for switching an air outlet mode for setting an air flow direction in the passenger compartment, a mode operation lever operatively linked with the mode operation member, an input door lever operatively linked with the inside/outside air operation member, and an output door lever connected to the inside/outside air switching door. The output door lever is disposed to be operated based on operation positions of the mode operation lever and the input door lever. In the vehicle air conditioner, when a defroster main mode where air more than a predetermined amount is blown from the defroster opening is manually set by the mode operation member, the output door lever is maintained by the mode operation lever to an outside air introduction position of the inside/outside air switching door, where only outside air is introduced into the air passage. On the other hand, when an air outlet mode except for the defroster main mode is manually set by the mode operation member, the output door lever is operated by the input door lever to set an air introduction mode which is set manually by the inside/outside air operation member. As a result, during the defroster main mode, even when an inside air mode is manually set by mistake by a passenger, an outside air introduction is forcibly set with the setting operation of the defroster main mode, and defrosting performance of a windshield is improved.

BRIEF DESCRIPTION OF THE DRAWINGS

Additional objects and advantages of the present invention will be more readily apparent from the following detailed description of preferred embodiments when taken together with the accompanying drawings, in which:

FIG. 8 is a view showing the relationship between an air outlet mode, an operation position of a temperature-adjustment operation member and an operation state of a second inside/outside air switching door according to the first embodiment;

FIG. 10 is a view showing inside/outside air operation states of an inside/outside switching door according to the second embodiment;

DETAILED DESCRIPTION OF THE PRESENTLY PREFERRED EMBODIMENTS

Preferred embodiments of the present invention will be described hereinafter with reference to the accompanying drawings.

A first preferred embodiment of the present invention will be described with reference to FIGS. 1–8. The first embodiment of the present invention is suitable for a vehicle in which an amount of heat generated from an engine is relatively small to heat cooling water (hot water) with the engine sufficiently, such as a vehicle having a diesel engine, an electrical vehicle and a hybrid vehicle. In a vehicle air conditioner described in FIG. 1, an inside/outside air double layer flow mode (double layer flow mode) can be set in a maximum heating.

Figure 1:
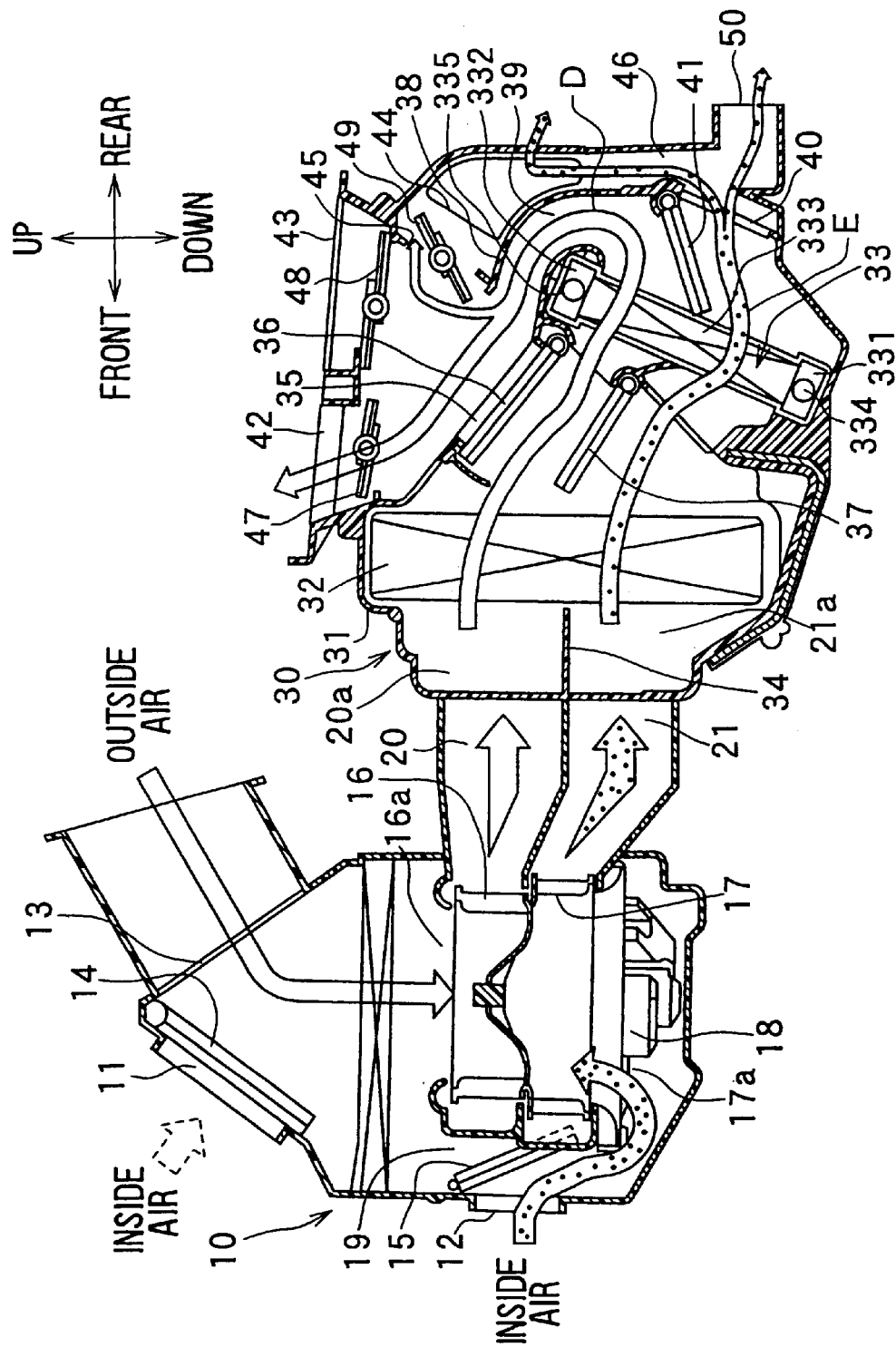
FIG. 1 is a schematic sectional view showing a ventilation system of a vehicle air conditioner according to a first preferred embodiment of the present invention.

As shown in FIG. 1, a ventilation system of the air conditioner includes a blower unit 10 and an air conditioning unit 30. The air conditioning unit 30 is generally disposed in a passenger compartment under an instrument panel at an approximate center of the instrument panel in a vehicle right-left direction (i.e., vehicle width direction). The air conditioning unit 30 is mounted on the vehicle to correspond to the arrangement in FIG. 1. On the other hand, the blower unit 10 is generally disposed to be offset from the air conditioning unit 30 in the vehicle right-left direction on a front passenger's seat side. However, in FIG. 1, for readily indicating both the blower unit 10 and the air conditioning unit 30, the blower unit 10 is arranged on a vehicle front side of the air conditioning unit 30.

Firstly, the blower unit 10 is described in detail. The blower unit 10 includes first and second inside air introduction ports 11, 12 from which inside air (i.e., air inside the passenger compartment) is introduced, and an outside air introduction portion 13 from which outside air (i.e., air outside the passenger compartment) is introduced. The first inside air introduction port 11, the second inside air introduction port 12 and the outside air introduction port 13 are selectively opened and closed by first and second inside/outside air switching doors 14, 15. Each of the first and second inside/outside air switching doors 14, 15 is a plate-like door rotatable around a rotation shaft.

The blower unit 10 has a blower case 10a (FIG. 2), and first and second fans 16, 17 overlapped in an up-down direction within the blower case 10a. The first and second fans 16, 17 are composed of centrifugal multi-blades fans (sirocco) and are rotated simultaneously by a single common electrical motor 18.

FIG. 1 shows an operation state of the air conditioner during the double layer flow mode. During the double layer flow mode, the first inside/outside air switching door 14 closes the first inside air introduction port 11 and opens the outside air introduction port 13, and the second inside/outside air switching door 15 opens the second inside air introduction port 12 and closes a communication path 19. Therefore, outside air introduced from the outside air introduction port 13 is sucked into a suction port 16a of the first fan 16, and is blown into a first air passage 20. On the other hand, inside air introduced from the second inside air introduction port 12 is sucked into a suction port 17a of the second fan 17, and is blown into a second air passage 21.

Further, as shown in FIG. 1, the first and second air passages 20, 21 are partitioned by a partition plate disposed between the first fan 16 and the second fan 17 in the blower unit 10.

The air conditioning unit 30 includes an evaporator 32 and a heater core 33 integrally accommodated within an air conditioning case 31. Within the air conditioning case 31, a first air passage 20a on an upper side and a second air passage 21a on a lower side are also partitioned from each other by a partition plate 34 at an upstream air side of the evaporator 32. Thus, air from the first and second air passages 20, 21 of the blower unit 10 flows into the first and second air passages 20a, 21a of the air conditioning unit 30, respectively. The evaporator 32 is disposed within the air conditioning case 31 to cross an entire area of the first and second air passages 20a, 21a. As being known well, the evaporator 32 is a cooling heat exchanger for cooling air passing therethrough by absorbing an evaporation latent heat of refrigerant of a refrigerant cycle from air.

The heater core 33 is disposed within the air conditioning case 31 at a downstream air side of the evaporator 32 to form a predetermined distance between the heater core 33 and the evaporator 32. The heater core 33 is disposed to be inclined toward a vehicle rear side relative to the vehicle up-down direction (i.e., vertical direction) by a predetermined angle. The heater core 33 is a heating heat exchanger for heating air having passed through the evaporator 32. The heater core 33 heats air passing therethrough by using hot water (engine-cooling water) as a heating source. Further, the heater core 33 is disposed in the air conditioning case 31 to form a bypass passage 35 at an upper side of the heater core 33, through which air having passed through the evaporator 32 bypasses the heater core 33.

First and second air mixing doors 36, 37 are disposed within the air conditioning case 31 between the evaporator 32 and the heater core 33 to adjust a ratio between an air amount passing through the heater core 33 and an air amount bypassing the heater core 33. Each of the first and second air mixing doors 36, 37 is a plate like door rotatable in the vehicle updown direction. The first and second air mixing doors 36, 37 are disposed to have a predetermined distance therebetween in the vehicle up-down direction. Therefore, the first and second air mixing doors 36, 37 are respectively rotatable without an interference therebetween. Further, in a maximum cooling, both the air mixing doors 36, 37 are rotated to fully close an air inlet passage of the heater core 33 while being overlapped with each other.

On the other hand, in the maximum heating, both the first and second air mixing doors 36, 37 are rotated to the positions indicated in FIG. 1. Therefore, the first air mixing door 36 fully closes the cool air bypass passage 35, and a top end of the second mixing door 37 is positioned at an approximate center position of the evaporator 32 in the vehicle up-down direction, immediately downstream air side of the evaporator 32. Thus, the second air mixing door 37 is used as a movable partition member for partitioning an air passage between the evaporator 32 and the heater core 33 into the first air passage 20a and the second air passage 21a during the maximum heating.

Further, a partition wall 38 extending in the vehicle up-down direction is provided at a downstream air side of the heater core 33 to have a predetermined distance between the partition wall 38 and the heater core 33, and is formed integrally with the air conditioning case 31. The partition wall 38 defines a warm air passage 39 through which air immediately after passing through the heater core 33 flows upwardly. Warm air from the warm air passage 39 and cool air from the cool air bypass passage 35 are mixed at an upper side position of the heater core 33.

Further, a warm air bypass opening 40 is opened at a lower side of the partition wall 38, and is opened and closed by a plate-like warm air bypass door 41. When the maximum heating (double layer flow mode) is set during a foot mode or a foot/defroster mode, the warm air bypass door 41 is operated to the position shown in FIG. 1 so that a top end of the warm air bypass door 41 is positioned at an approximate center position of the heater core 33 in the vehicle up-down direction. Therefore, the warm air bypass door 41 is used as a movable partition member for partitioning the warm air passage 39 immediately after the heater core 33 into the first air passage 20a and the second air passage 21a during the double layer flow mode.

On an upper surface of the air conditioning case 31, a defroster opening 42 from which air is blown toward an inner surface of a windshield is opened at a vehicle front side. Further, a face opening 43 from which air is blown toward the head portion of a passenger in the passenger compartment is opened on the upper surface of the air conditioning case 31 at a vehicle rear side from the defroster opening 42. Further, a front foot opening 44 is opened on both right and left surfaces of the air conditioning case 31. Conditioned air having been temperature-controlled flows into the front foot opening 44 through an inlet opening 45, and warm air from the warm air bypass opening 40 also flows into the front foot opening 44 through a warm air passage 46. Warm air from the front foot opening 44 is blown toward the foot area of a passenger on a front seat in the passenger compartment through a front foot duct (not shown).

The defroster opening 42, the face opening 43 and the inlet opening 45 of the front foot opening 44 are opened and closed by mode switching doors 47, 48, 49, respectively, each of which is a rotatable plate like door.

Further, a rear foot opening 50 is opened at a lower end portion of the air conditioning case 31 to face the warm air bypass opening 40. Therefore, warm air from the warm air bypass opening 40 and the warm air passage 46 flows into the rear foot opening 50, and is blown toward the foot area of a passenger on a rear seat through a rear foot duct (not shown).

In FIG. 1, the heater core 33 includes an inlet tank 331, an outlet tank 332, and a core portion 333 between the inlet tank 331 and the outlet tank 332. An inlet pipe 334 through which hot water from the vehicle engine flows into the inlet tank 331 is provided in the inlet tank 331. On the other hand, an outlet pipe 335 through which hot water having been heat-exchanged in the core portion 333 is discharged to an outside from the outlet tank 332 is provided to the outlet tank 332.

Figure 2:
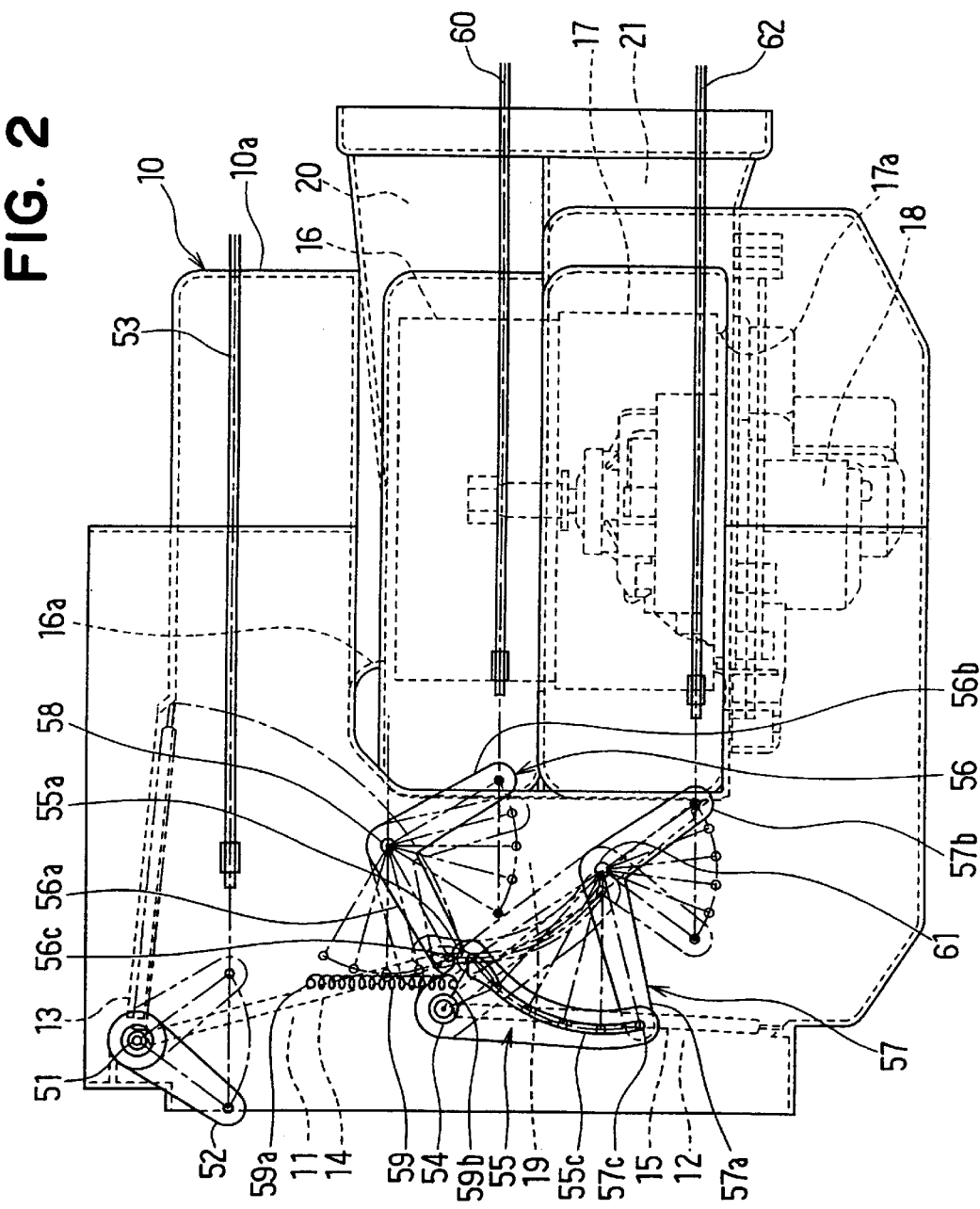
FIG. 2 is a front view of a blower unit having a link lever system according to the first embodiment.

FIG. 2 is an enlarged view showing the blower unit 10 having a link lever system in detail. In FIG. 1, the first and second inside air introduction ports 11, 12 are arranged to be separated in the vehicle up-down direction. However, in FIG. 2, the first and second inside air introduction ports 11, 12 are arranged continuously in the vehicle up-down direction.

As shown in FIG. 2, the first inside/outside air switching door 14 for opening and closing the first inside air introduction port 11 and the outside air introduction port 13 is rotatable around a rotation shaft 51. A first door lever 52 is integrally connected to the rotation shaft 51 of the first inside/outside air switching door 14 to be rotatable on an outer surface of the blower case 10a of the blower unit 10. Further, a cable 53 is connected to a top end portion of the first door lever 52. By moving the cable 53 in a right-left direction in FIG. 2, the first inside/outside air switching door 14 is rotated in the right-left direction in FIG. 2 around the rotation shaft 51 through the first door lever 52. When the first door lever 52 is position in the solid line position in FIG. 2, the first inside/outside air switching door 14 is operated to an outside air introduction position so that outside air is introduced from the outside air introduction port 13. On the other hand, when the first door lever 52 is position in the chain line position in FIG. 2, the first inside/outside air switching door 14 is operated to an inside air introduction position so that inside air is introduced from the first inside air introduction port 11.

Figure 5:
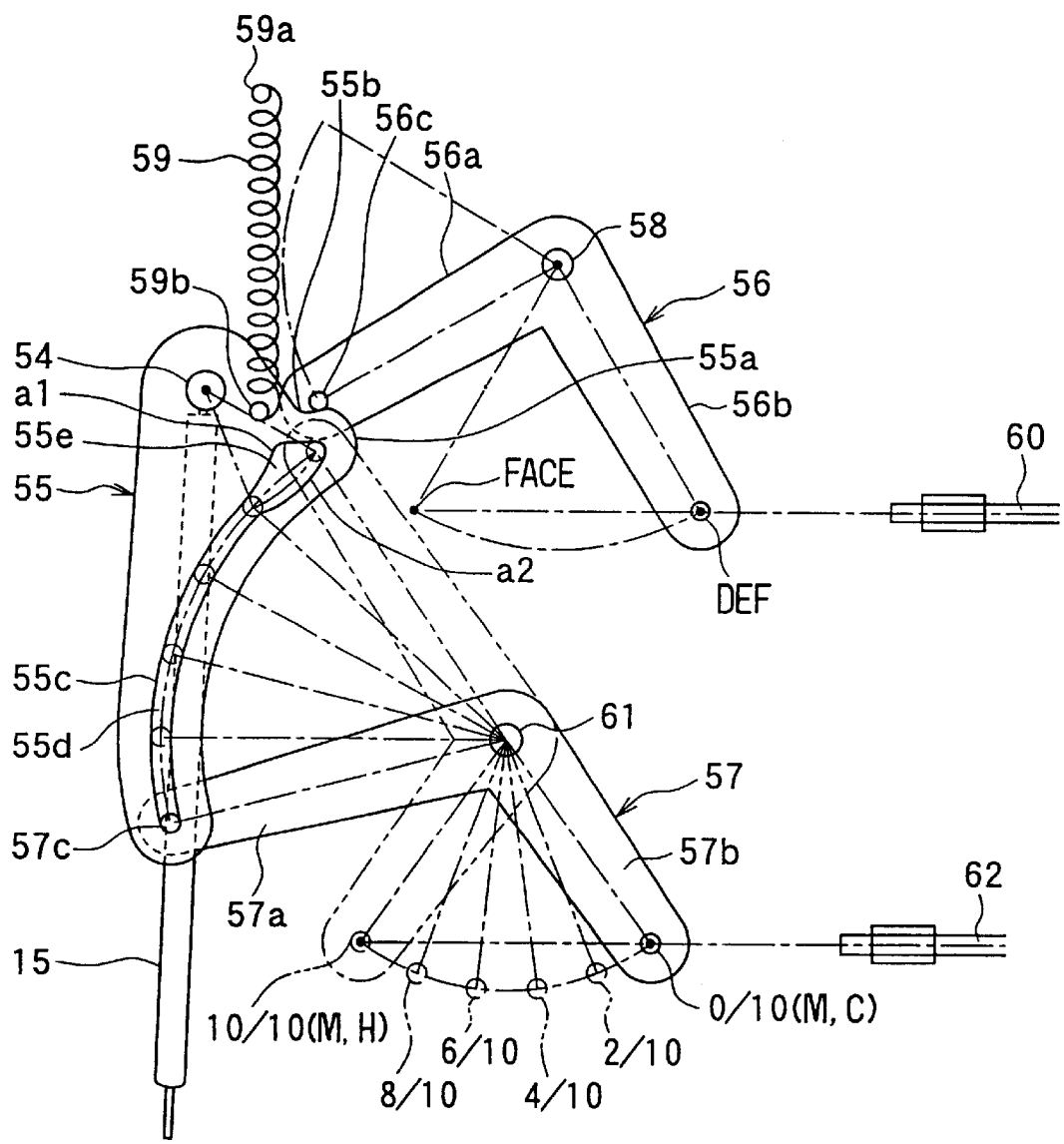
FIG. 5 is view for explaining operation of the link lever system of the blower unit in FIG. 4.

On the other hand, the second inside/outside air switching door 15 for opening and closing the second inside air introduction port 12 and the communication path 19 is rotatable around a rotation shaft 54. A second door lever 55 is integrally connected to the rotation shaft 54 of the second inside/outside air switching door 15 to be rotatable on the outer surface of the blower case 10a of the blower unit 10. As shown in FIG. 5, the second door lever 55 has an enlarged flat portion at a position proximate to the rotation shaft 54, and a protrusion 55a is formed in the enlarged flat portion of the second door lever 55. The protrusion 55a is provided so that a recess portion 55b is formed on an outer peripheral portion of the protrusion 55a. Further, a circular arc cam recess portion 55c is provided in the second door lever 55 to extend from an end position where the protrusion 55a is formed to the other end position.

The second door lever 55 is integrally rotatable with the second inside/outside air switching door 15 in accordance with operation positions of a mode operation lever 56 and a temperature-adjustment operation lever 57. Here, the second door lever 55 is an output lever of the link lever system, and both operation levers 56, 57 are input levers relative to the second door lever 55.

On the outer surface of the blower case 10a of the blower unit 10, the mode operation lever 56 is disposed at a most back side in a paper face-back direction in FIG. 2, the temperature-adjustment operation lever 57 is disposed at a face side from the mode operation lever 56, and the second door lever 55 is disposed at a most face side in the paper face-back direction of FIG. 2. That is, because the three levers 55, 56, 57 are disposed to be offset in the paper face-back direction in FIG. 2, an interference between the three levers 55, 56, 57 is prevented.

Figure 4:
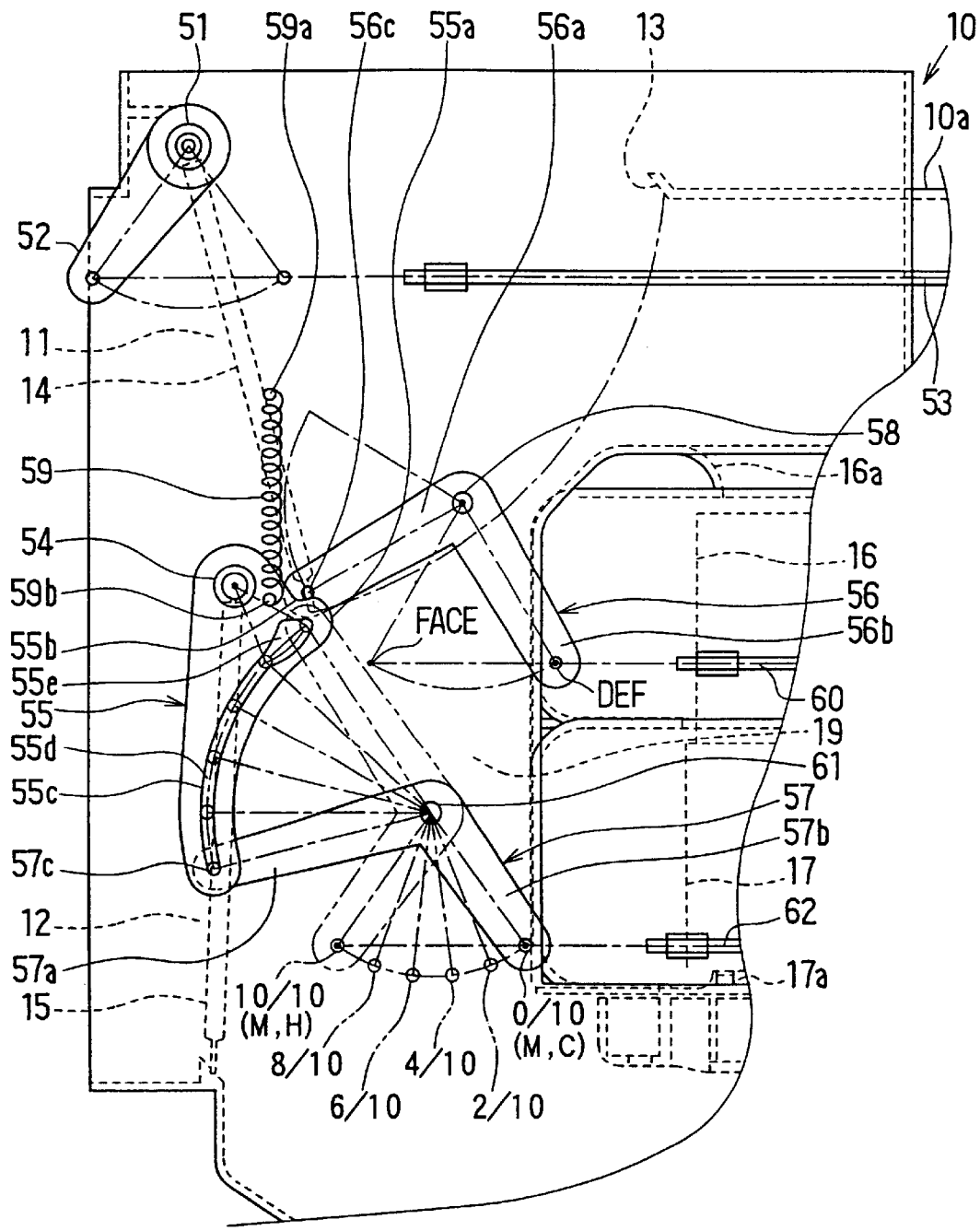
FIG. 4 is an enlarged view showing a main portion of the blower unit during a defroster mode, according to the first embodiment.

The mode operation lever (i.e., first input lever) 56 is formed into an approximate L-shape to have first and second lever pieces 56a, 56b, as shown in FIG. 4. A rotation shaft 58 is disposed between both the first and second lever pieces 56a, 56b at an approximate middle position of the L-shaped mode operation lever 56. The solid line position of the mode operation lever 56, shown in FIGS. 2, 4, 5, indicates a defroster mode position. When the mode operation lever 56 is moved in the clockwise direction from the defroster mode position by predetermined angles in order, the mode operation lever 56 moves in order to a foot/defroster (F/D) mode position, a foot (FOOT) mode position, a bi-level (B/L) mode position and a face (FACE) mode position.

A pin 56c is provided at a top end portion of the first lever piece 56a in the mode operation lever 56 so that the pin 56c contacts the recess portion 55b of the second door lever 55. A coil-like spring 59 is an elastic member, and is disposed so that a spring force of the spring 59 is applied to the second door lever 55. Therefore, a rotation force in the counterclockwise direction is applied to the second door lever 55 by the spring 59. That is, the counterclockwise direction corresponds to a direction where the second inside/outside air switching door 15 opens the second inside air introduction port 12. One end 59a of the spring 59 is supported in and is fixed to the outer surface of the blower case 10a, and the other end 59b of the spring 59 is connected to the second door lever 55 at a position near the protrusion 55a as compared with the rotation shaft 54, as shown in FIG. 5.

A cable 60 is connected to a top end portion of the second lever piece 56b of the mode operation lever 56. Therefore, by moving the cable 60 in the right-left direction in FIG. 2, the mode operation lever 56 rotates in the right-left direction in FIG. 2 around the rotation shaft 58.

The temperature-adjustment operation lever (i.e., second input lever) 57 is formed into an approximate V-shape having first and second lever pieces 57*a*, 57*b*. A rotation shaft 61 is disposed at a middle portion of the V-shaped temperature-adjustment operation lever 57 between the first and second lever pieces 57*a*, 57*b*, so that the temperature-adjustment operation lever 57 is rotatable on the outer surface of the blower case 10*a* of the blower unit 10. A Pin 57*c* is provided at a top end portion of the first lever piece 57*a* to be slidable in the cam recess portion 55*c* of the second door lever 55.

The solid position of the temperature-adjustment operation lever 57 in FIGS. 2, 4, 5 is the maximum cooling position M.C (i.e., 0/10 position). The temperature-adjustment operation lever 57 is rotated from the maximum cooling position M.C (0/10 position) clockwise to each position of 2/10, 4/10, 6/10, 8/10, 10/10 (i.e., maximum heating position M.H). In FIGS. 3–6, the maximum cooling position is indicated by "M.C", and the maximum heating position is indicated by "M.H".

At the maximum cooling position of the temperature-adjustment operation lever 57, both the first air mixing door 36 and the second air mixing door 37 fully closes the air inlet passage of the heater core 33 and fully opens the cool air bypass passage 35, in FIG. 1. Further, at the maximum heating position, both the first air mixing door 36 and the second air mixing door 37 fully opens the air inlet passage of the heater core 33 and fully closes the cool air bypass passage 35 as shown in FIG. 1.

As shown in FIG. 5, a circular arc shaped idling recess 55*d* corresponding to a rotation locus of the pin 57*c* of the temperature-adjustment operation lever 57 is provided in the cam recess portion 55*c* of the second door lever 55. When the temperature-adjustment operation lever 57 is positioned at a position (i.e., 0/10 position–8/10 position) except for the maximum heating position, the pin 57*c* of the temperature-adjustment operation lever 57 is engaged into the idling recess 55*d* of the cam recess portion 55*c* of the second door lever 55.

An enlarged recess 55*e* having an outside enlarged shape al enlarged toward an outer side and an inside enlarged shape a2 enlarged toward an inner side from the rotation locus of the pin 57*c* is formed in the cam recess portion 55*c* at the maximum heating position of the temperature-adjustment operation lever 57. The outside enlarged shape a1 is enlarged in a direction away from the rotation center of the temperature-adjustment operation lever 57, and the inside enlarged shape a2 is enlarged in a direction close to the rotation center of the temperature-adjustment operation lever 57. Further, the inside enlarged shape a2 is a circular arc shape using the rotation shaft 54 as a rotation center.

When the mode operation lever 56 is positioned at the solid line position (i.e., defroster mode position) in FIGS. 2, 4, 5), even when the temperature-adjustment operation lever 57 is rotated between the 0/10 position and the 10/10 position, the pin 57*c* of the temperature-adjustment operation lever 57 only slides within the cam recess portion 55*c* of the second door lever 55. Thus, in this case, an operation force is not applied from the temperature-adjustment operation lever 57 to the second door lever 55 by rotating the temperature-adjustment operation lever 57.

Because a cable 62 is connected to a top end portion of the second lever piece 57*b* of the temperature-adjustment operation lever 57, the temperature-adjustment lever 57 is rotated around the rotation shaft 61 by moving the cable 62 in the right-left direction in FIG. 2.

Figure 3:
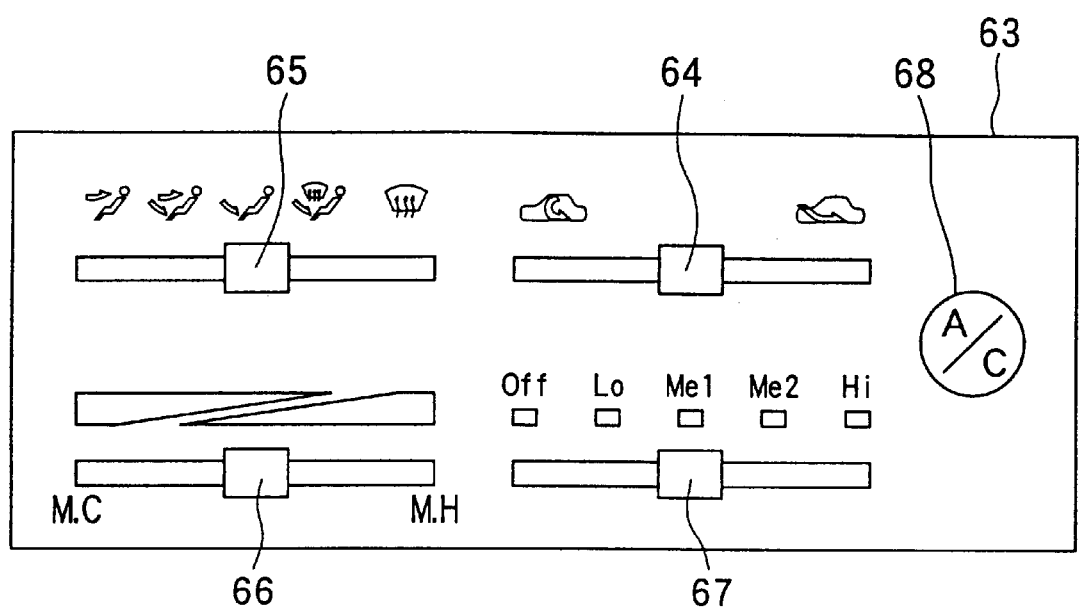
FIG. 3 is a front view showing an operation panel of the vehicle air conditioner.

FIG. 3 shows an air-conditioning operation panel 63 disposed in the passenger compartment at a position near the instrument panel. Operation members 64–68 manually operated by a passenger are provided on the operation panel 63. Specifically, the cable 53 connected to the first door lever 52 is operatively linked with a lever-type inside/outside air operation member 64. Further, the cable 60 connected to the mode operation lever 56 is operatively linked with a mode operation member 65, and a link mechanism for driving the mode switching doors 47, 48, 49 is also connected to the mode operation member 65 through a cable, The cable 62 connected to the temperature-adjustment operation lever 57 is operatively linked with a temperature-adjustment operation member 66, and a link mechanism for driving the first and second air mixing doors 36, 37 is also connected to the temperature-adjustment operation member 66 through a cable. Further, a switch for controlling voltage applied to the electrical motor 18 of the blower unit 10 is connected to an air-flow operation member 67. Therefore, by operating the switch, a rotation speed of the electrical motor 18 is adjusted, and the air amount blown from the blower fans 16, 17 is adjusted. Further, operation of a compressor of the refrigerant cycle having the evaporator 32 is switched by an air-conditioning switch 68.

Next, operation of the link lever system of the air conditioner according to the first embodiment will be now described. FIG. 4 shows a part of the blower unit 10 during the defroster mode. FIG. 5 is an enlarged view showing the link lever system during the defroster mode. During the defroster mode, for defrosting the windshield, an outside air mode is set so that only outside air having a low humidity is introduced. Therefore, the inside/outside air operation member 64 is operated at the outside air introduction position, so that the first inside/outside air switching door 14 is operated at an outside air introduction position where the outside air introduction port 13 is fully opened, through the cable 53 and the first door lever 52.

On the other hand, when the mode operation member 65 is manually operated to the defroster mode position, the mode switching doors 47–49 open the defroster opening 42 and close both the face opening 43 and the inlet opening 45 of the foot opening 44. Further, the warm air bypass opening 40 is closed by the warm air bypass door 41. Simultaneously, by the manual operation of the mode operation member 65 at the defroster mode position, the mode operation lever 56 is operated to a defroster mode position shown by the solid line in FIGS. 4, 5 through the cable 60.

Thus, the pin 56*c* provided at the top end portion of the first lever piece 56*a* of the mode operation lever 56 press-contacts the recess portion 55*b* on the outer peripheral portion of the protrusion 55*a* of the second door lever 55.

Because a press-contact state between the pin 56*c* of the mode operation lever 56 and the recess portion 55*b* of the second door lever 55 is maintained while opposing the spring force of the spring 59, a rotation of the second door lever 55 in the counterclockwise direction is prevented. Therefore, the second door lever 55 is set at the closing position of the second inside air introduction port 12, shown by the solid line in FIGS. 4, 5, so that the second inside/outside air switching door 15 closes the second inside air introduction port 12 and opens the communication path 19. At this time, even when the temperature-adjustment operation lever 57 is rotated between the 0/10 position to the 10/10 position, the pin 57c of the temperature-adjustment operation lever 57 only slides within the cam recess portion 55c of the second door lever 55. Therefore, operation force is not applied from the temperature-adjustment operation lever 57 to the second door lever 55. Thus, the second door lever 55 is maintained at the closing position of the second inside air introduction port 12, so that the second inside/outside air switching door 15 continuously closes the second inside air introduction port 12 and continuously opens the communication path 19. As a result, during the defroster mode, only outside air is introduced from the outside air introduction port 13 into both the fans 16, 17 of the blower unit 10, and is blown toward the windshield from the defroster opening 42.

As described above, by press-contacting the pin 56c of the mode operation lever 56 and the recess portion 55b of the second door lever 55, the second inside/outside air switching door 15 is maintained at the closing position of the second inside air introduction port 12. That is, in the first embodiment of the present invention, a first engagement unit is constructed by the press-contact between the pin 56c of the mode operation lever 56 and the recess portion 55b of the second door lever 55.

Figure 6:
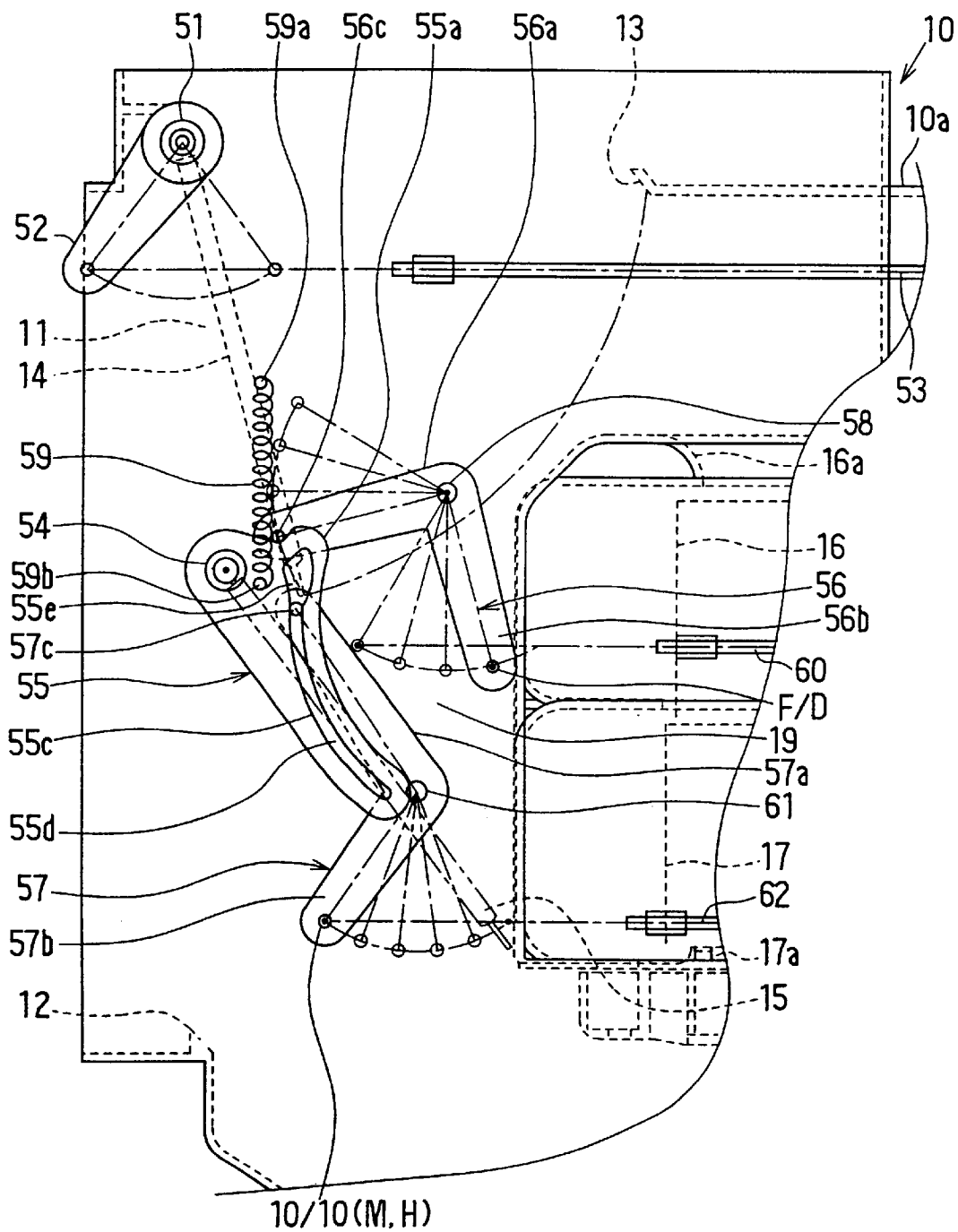
FIG. 6 is an enlarged view showing a main portion of the blower unit during a foot/defroster mode, according to the first embodiment.
Figure 7:
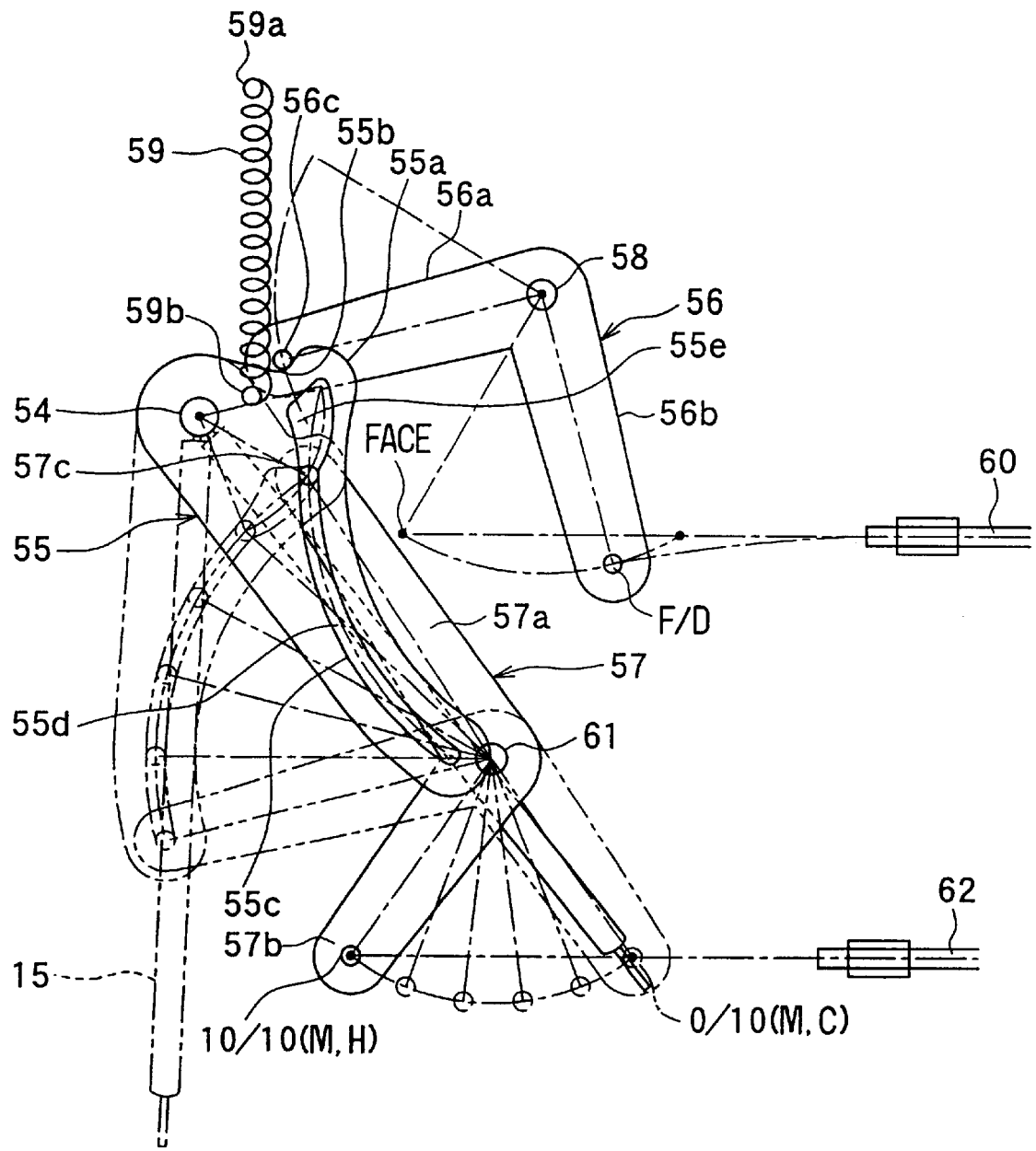
FIG. 7 is view for explaining operation of the link lever system of the blower unit in FIG. 6.

FIGS. 6, 7 show a maximum heating (M. H) during a foot/defroster mode, when the foot/defroster mode is selected from the defroster mode. During the maximum heating, the temperature-adjustment operation lever 57 is set at the maximum heating position (10/10 position), and the pin 57c provided at the top end portion of the first lever piece 57a of the temperature-adjustment operation lever 57 is positioned in the enlarged recess 55e of the cam recess portion 55c of the second door lever 55.

By manually switching the foot/defroster mode from the defroster mode, the mode operation lever 56 is rotated from the position shown in FIGS. 4, 5 during the defroster mode in the clockwise direction by a predetermined angle. Therefore, the pin 56c of the mode operation lever 56 is moved upwardly and is separated from the recess portion 55b of the second door lever 55. As a result, the contact state between the pin 56c of the mode operation lever 56 and the recess portion 55b of the second door lever 55 is released.

On the other hand, the inside enlarged shape a2 of the enlarged recess 55e is the circular arc shape having a rotation center corresponding to the rotation shaft 54 of the second door lever 55. As a result, while the temperature-adjustment operation lever 57 is maintained at the maximum heating position, it is possible to rotate the second door lever 55 from the position in FIG. 5 in the counterclockwise direction around the rotation shaft 54 by the spring force of the spring 59. Therefore, the second door lever 55 is moved from the position in FIG. 5 to the position in FIGS. 6, 7. In this case, the second door lever 55 is operated to an opening position of the second inside air introduction port 12 so that the second inside/outside air switching door 15 opens the second inside air introduction port 12 and closes the communication path 19.

Next, in a state where the mode operation lever 56 is operated to the solid line position in FIGS. 6, 7 and the foot/defroster mode is set, an operation of the temperature-adjustment operation lever 57 from a middle temperature area (i.e., a position equal to or lower than 8/10) to the maximum heating position (i.e., 10/10 position) will be now described. At this time, the pin 57c of the temperature-adjustment operation lever 57 moves from the idling recess 55d to the enlarged recess 55e.

Because the outer enlarged shape a1 enlarged outside from the circular arc shape of the idling recess 55d is provided in the enlarged recess 55e, the pin 57c of the temperature-adjustment operation lever 57 is moved along a wall surface of the outer enlarged shape a1 from the 8/10 position to the 10/10 position, and the second door lever 55 is rotated from the chain line position in FIG. 7 toward the solid line position in FIG. 7 by the spring force of the spring 59. Thus, the second inside/outside air switching door 15 opens the second inside air introduction port 12 and closes the communication path 19.

That is, in a releasing state where the press-contact between the pin 56c and the recess portion 55b is released, when the pin 57c of the temperature-adjustment operation lever 57 is plated in the enlarged recess 55e, it is possible to displace the second door lever 55 while the position of the pin 57c is maintained. As a result, the second door lever 55 is rotated in the counterclockwise direction around the rotation shaft 54, so that the second inside/outside air switching door 15 opens the second inside air introduction port 12 and closes the communication path 19.

In the air-conditioning operation panel 63, the inside/outside air operation member 64 is manually operated to an outside air introduction position, so that the inside/outside air switching door 14 is operated to open the outside air introduction port 13. In this state, when the mode operation member 65 is manually operated to a foot/defroster mode position, and when the temperature-adjustment operation member 66 is manually operated to the maximum heating position, the second inside/outside air switching door 15 is operated to the opening position of the second inside air introduction port 12.

Thus, by manually operating the mode operation member 65 and the temperature-adjustment operation member 66, the double layer flow mode is automatically set without using an additional operation member.

Next, when the air outlet mode is switched from the foot/defroster mode to the foot mode, the mode operation lever 56 is further rotated in the clockwise direction by a predetermined angle. When the air outlet mode is switched from the foot mode to the bi-level mode, or when the air outlet mode is switched from the bi-level mode to the face mode, the mode operation lever 56 is rotated in the clockwise direction by a predetermined angle. In each of the foot/defroster mode, the foot mode, the bi-level mode and the face mode, the pin 56c of the mode operation lever 56 is separated from the recess portion 55b of the second door lever 55. Therefore, when the maximum heating (M, H) of the temperature-adjustment operation lever 57 is manually set by the temperature-adjustment operation member 66, the double layer flow mode is automatically set.

Conversely, when the air outlet mode is switched from the foot/defroster mode or the face mode to the defroster mode, the mode operation lever 56 is rotated in the counterclockwise direction, and the pin 56c of the mode operation lever 56 presses and contacts the recess portion 55b of the second door lever 55. In this case, the second door lever 55 is rotated in the clockwise direction to be opposite to the spring force of the spring 59, and the second inside/outside air switching door 15 is forcibly rotated to the closing position of the second inside air introduction port 12.

Even in this case, it is possible to rotate the second door lever 55 in the clockwise direction while the pin 57c is maintained at the maximum heating position, because the inside enlarged shape a2 is the circular arc shape using the rotation shaft 54 as the rotation center. Therefore, the second door lever 55 can be rotated so that the second inside/outside air switching door 15 closes the second inside air introduction port 12, without adding an operation force to the temperature-adjustment operation lever 57.

Further, when the temperature-adjustment operation member 66 is operated from the maximum heating position to a middle temperature area position, the temperature-adjustment operation lever 57 is rotated in the counterclockwise direction from the state shown in FIGS. 6, 7, and the pin 57c of the temperature-adjustment operation lever 57 moves from the enlarged recess 55e to the idling recess 55d. Therefore, the second door lever 55 is rotated in the clockwise direction to be opposite to the spring force of the spring 59, so that the second inside/outside air switching door 15 closes the second inside air introduction port 12 and opens the communication path 19. As a result, outside air is introduced into the second fan 17.

When the temperature-adjustment operation member 66 is manually operated to a middle temperature area position (8/10–0/10 position), the pin 57c of the temperature-adjustment operation lever 57 is engaged with the idling recess of the cam recess portion 55c of the second door lever 55. Therefore, the pin 57c contacts a wall surface defining the idling recess 55d to prevent the second door lever 55 from moving in the counterclockwise direction.

That is, the engagement between the idling recess 55d and the pin 57c prevents a movement of the second door lever 55 in the counterclockwise direction, due to the spring force of the spring 59. Therefore, in the first embodiment, a second engagement unit for preventing a displacement of the second door lever 55 and for maintaining the position (i.e., the closing position of the second inside air introduction port 12) of the second inside/outside air switching door 15 is constructed by the engagement between the idling recess 55d of the second door lever 55 and the pin 57c of the temperature-adjustment operation lever 57.

FIG. 8 shows the opening/closing operation of the second inside/outside air switching door 15. In FIG. 8, "opening" indicates the opening state of the second inside air introduction port 12 due to the second inside/outside air switching door 15, and "closing" indicates the closing state of the second inside air introduction port 12 due to the second inside/outside air switching door 15. As shown in FIG. 8, in a condition where an air outlet mode is a mode except for the defroster mode and the temperature-adjustment operation member 66, i.e., the temperature-adjustment operation lever 57 is at the maximum heating position (M, H), the second door lever 55 is operated to the opening position of the second inside air introduction port 12 where the second inside/outside air switching door 15 opens the second inside air introduction port 12.

Figure 9:
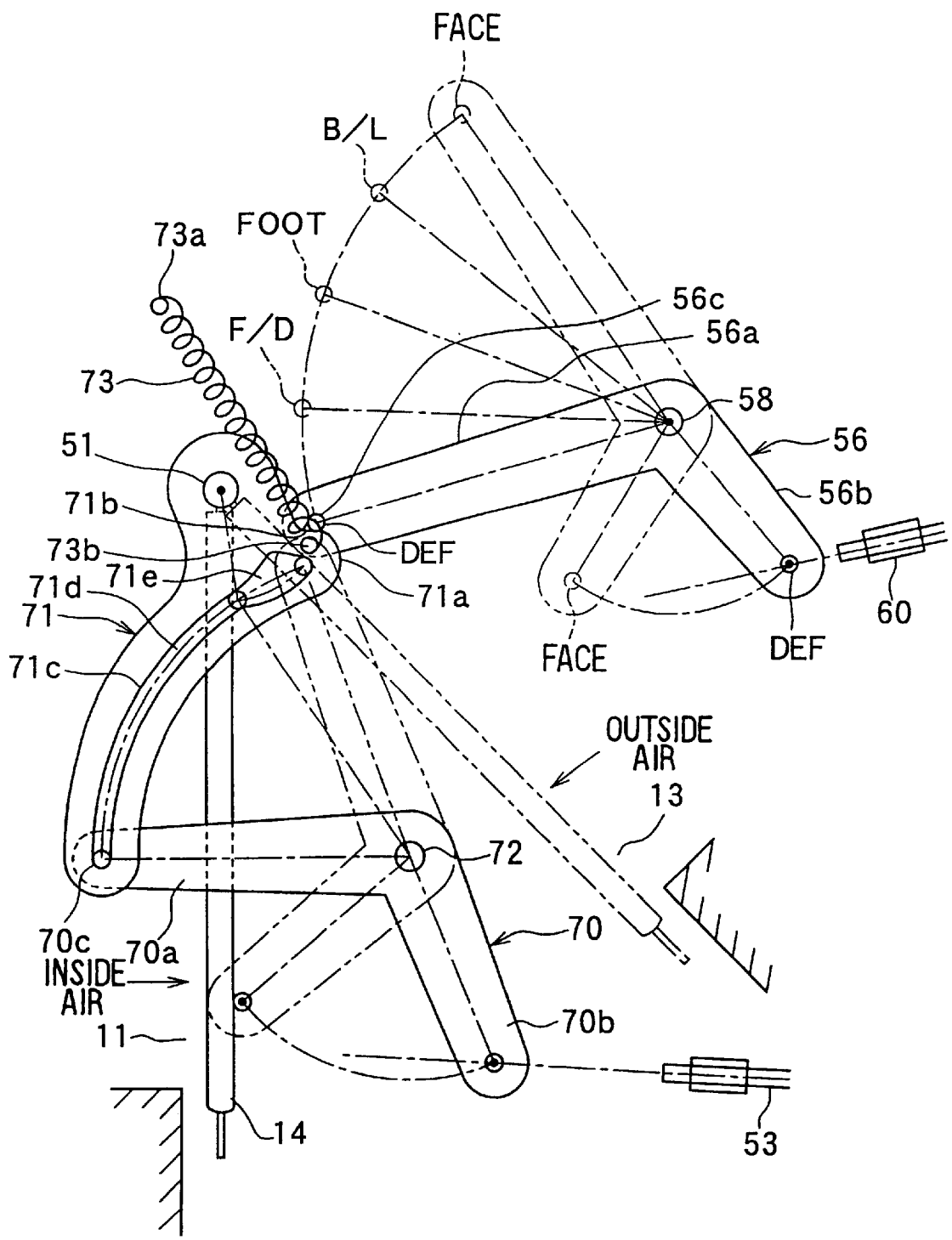
FIG. 9 is a front view showing a link lever system according to a second preferred embodiment of the present invention.

A second preferred embodiment of the present invention will be now described with reference to FIGS. 9 and 10. In the second embodiment, the link lever system for performing the opening/closing operation of the second inside/outside air switching door 15 according to the first embodiment is applied to a link lever system for operating the first inside/outside air switching door 14.

In the second embodiment, as the link lever system for opening and closing the first inside/outside air switching door 14, an input door lever 70 connected to the cable 53 and an output door lever 71 are provided. The output door lever 71 is operated based on the input door lever 70 and the mode operation lever 56. The input door lever 70 has a shape similar to the temperature-adjustment operation lever 57 described in the first embodiment. That is, the input door lever 70 includes first and second lever pieces 70a, 70b, and is rotated around a rotation shaft 72. A pin 70c is provided at a top end portion of the first lever piece 70a of the input door lever 70.

On the other hand, the output door lever 71 has a shape similar to that of the second door lever 55 described in the first embodiment, and is integrally connected to the rotation shaft 51 of the first inside/outside air switching door 14. The output door lever 71 includes a protrusion 71a, a recess portion 71b and a circular-arc cam recess portion 71c, respectively corresponding to the protrusion 55a, the recess portion 55b and the cam recess portion 55c of the second door lever 55. Further, similarly to the cam recess portion 55c, the cam recess portion 71c has a circular arc idling recess 71d into which the pin 70c is slidably inserted, and an enlarged recess 71e.

Further, similarly to the spring 59 of the first embodiment, a spring 73 is connected to the output door lever 71 so that it is possible to rotate the output door lever 71 in the counterclockwise by the spring force of the spring 73.

On the other hand, the pin 56c provided at the top end portion of the first lever piece 56a of the mode operation lever 56 is disposed to contact the recess portion 71b of the output door lever 71. That is, the solid line position of FIG. 9 indicates a state during the defroster mode (DEF). During the defroster mode, by the press-contacting between the pin 56c of the mode operation lever 56 and the recess portion 71b of the output door lever 71, the output door lever 71 is maintained at the position shown by the solid line in FIG. 9. Therefore, during the defroster mode, the first inside/outside air switching door 14 is forcibly operated to open the outside air introduction port 13 and to close the inside air introduction port 11.

Thus, during the defroster mode, even when the inside/outside air operation member 64 is manually operated at the inside air introduction position, only the input door lever 70 connected to the cable 53 rotates in the clockwise direction while the output door lever 71 and the inside/outside air switching door 14 are maintained at the outside air introduction position.

FIG. 10 shows relationships between an operation position of the inside/outside air operation member 64 of the air-conditioning operation panel 63, an air outlet mode, and an inside/outside air introduction position of the first inside/outside air switching door 14.

As shown in FIG. 10, during the face mode (FACE), the bi-level mode (B/L), the foot mode (FOOT) or the foot/defroster mode (F/D), an inside/outside air introduction mode of the first inside/outside air switching door 14 is determined based on the operation position of the inside/outside air operation member 64. However, during the defroster mode (DEF), the first inside/outside air switching door 14 is always operated to the outside air introduction position, regardless of the operation position of the inside/outside air operation member 64. That is, regardless of the operation position of the inside/outside air operation member 64, the outside air introduction mode is forcibly set during the defroster mode. In FIG. 10, "inside air" indicates an inside air introduction mode of the first inside/outside air switching door 14, and "outside air" indicates an outside air introduction mode of the first inside/outside air switching door 14.

The link lever system according to the second embodiment is not limited to the air conditioner described in the first embodiment which can set the double layer flow mode. That is, the link lever system of the second embodiment may be applied to a vehicle air conditioner where the double layer flow mode is not set. For example, the second embodiment may be applied to a vehicle air conditioner in which the first air passage 20, 20a and the second air passage 21, 21a are not partitioned and an inside/outside air mode is switched by using only a single inside/outside air switching door.

Figure 11:
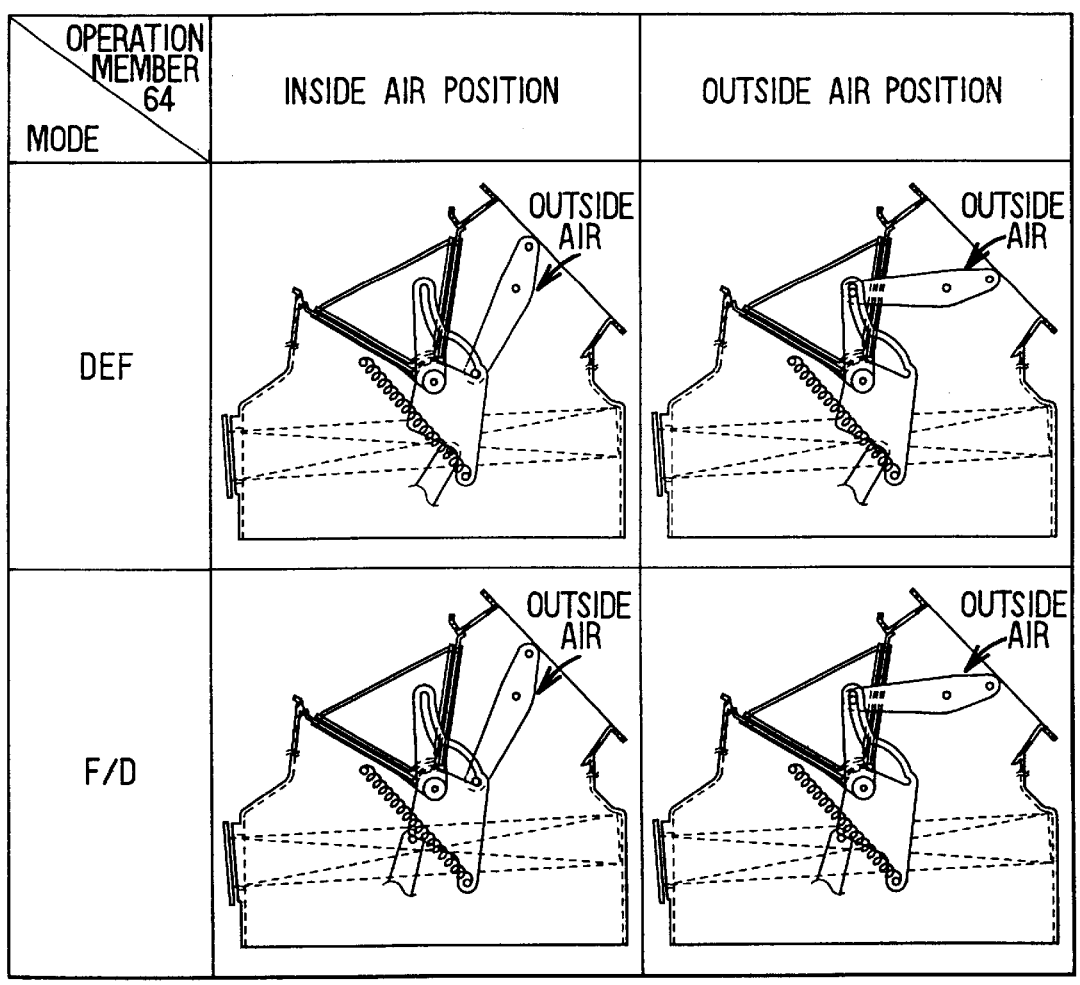
FIG. 11 is a view showing a relationship between an air outlet mode, an operation position of an inside/outside air operation member and an inside/outside air introduction mode, according to a third preferred embodiment of the present invention.
Figure 12:
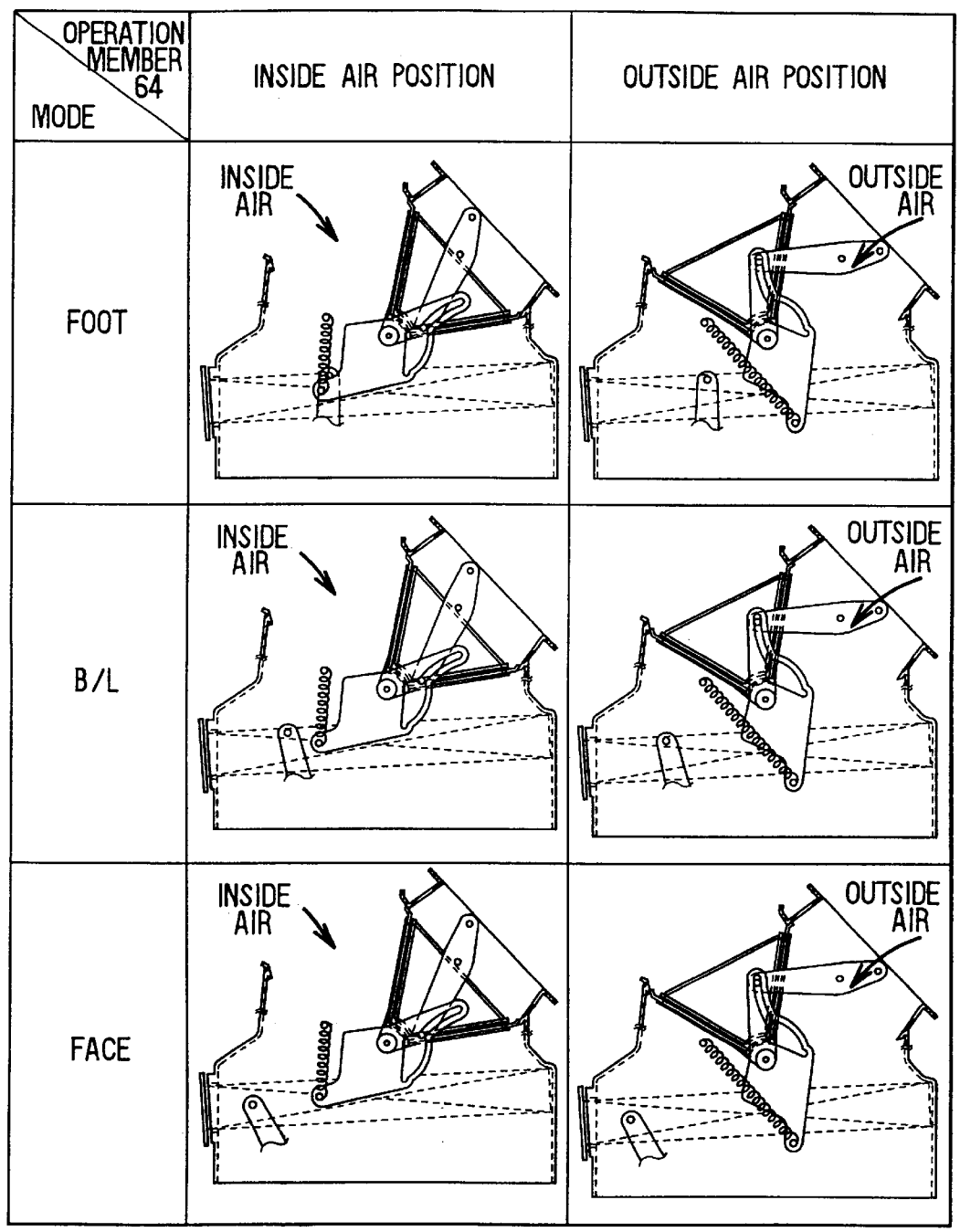
FIG. 12 is a view showing a relationship between the air outlet mode, the operation position of the inside/outside air operation member and the inside/outside air introduction mode, according to the third embodiment.

A third preferred embodiment of the present invention will be now described with reference to FIGS. 11–15. In the third embodiment, during both the defroster mode and the foot/defroster mode, the outside air introduction mode is forcibly set regardless of the manual operation position of the inside/outside air operation member 64, as shown in FIGS. 11, 12. In the third embodiment, components similar to those described in the first and second embodiments are indicated by the same reference number.

In the third embodiment, as shown in FIGS. 11–15, a single inside/outside air switching door 14 is used as the inside/outside air switching door. Further, the inside/outside air switching door 14 is a rotary door which can reduce an operation force while preventing an affect of a travelling dynamical pressure. By using the rotary door, opening areas of the inside/outside air introduction ports can be increased.

An inside/outside air switching device using the rotary-type inside/outside air switching door 14 and a link lever system thereof are described with reference to FIGS. 13–15. An inside/outside air switching box is disposed at an upper side of the blower case 10a of the blower unit 10. In the inside/outside air switching box, an inside air introduction port 11 from which inside air is introduced is provided at a rear side in a vehicle front-rear direction, and an outside air introduction port 13 from which outside air is introduced is provided at a front side in the vehicle front-rear direction. Air introduced from the inside air introduction port 11 and the outside air introduction port 13 is cleaned in a filter 79.

Next, the structure of the rotary-type inside/outside air switching door 14 is described. As shown in FIG. 15, the inside/outside air switching door 14 includes an outer peripheral surface 14a extending in a door rotation direction "a" (circumferential direction), and both fan-like side plates 14b. Both side end portions of the outer peripheral surface 14a in an axial direction of the rotation shaft 51 and the rotation shaft 51 are connected by the side plates 14b. A dimension of a door base portion constructed by the outer peripheral surface 14a and the side plates 14b is set to have a dimension necessary for closing the inside air introduction port 11. Further, the outside air introduction port 13 is closed by the outer peripheral surface 14a of the door 14.

Figure 13:
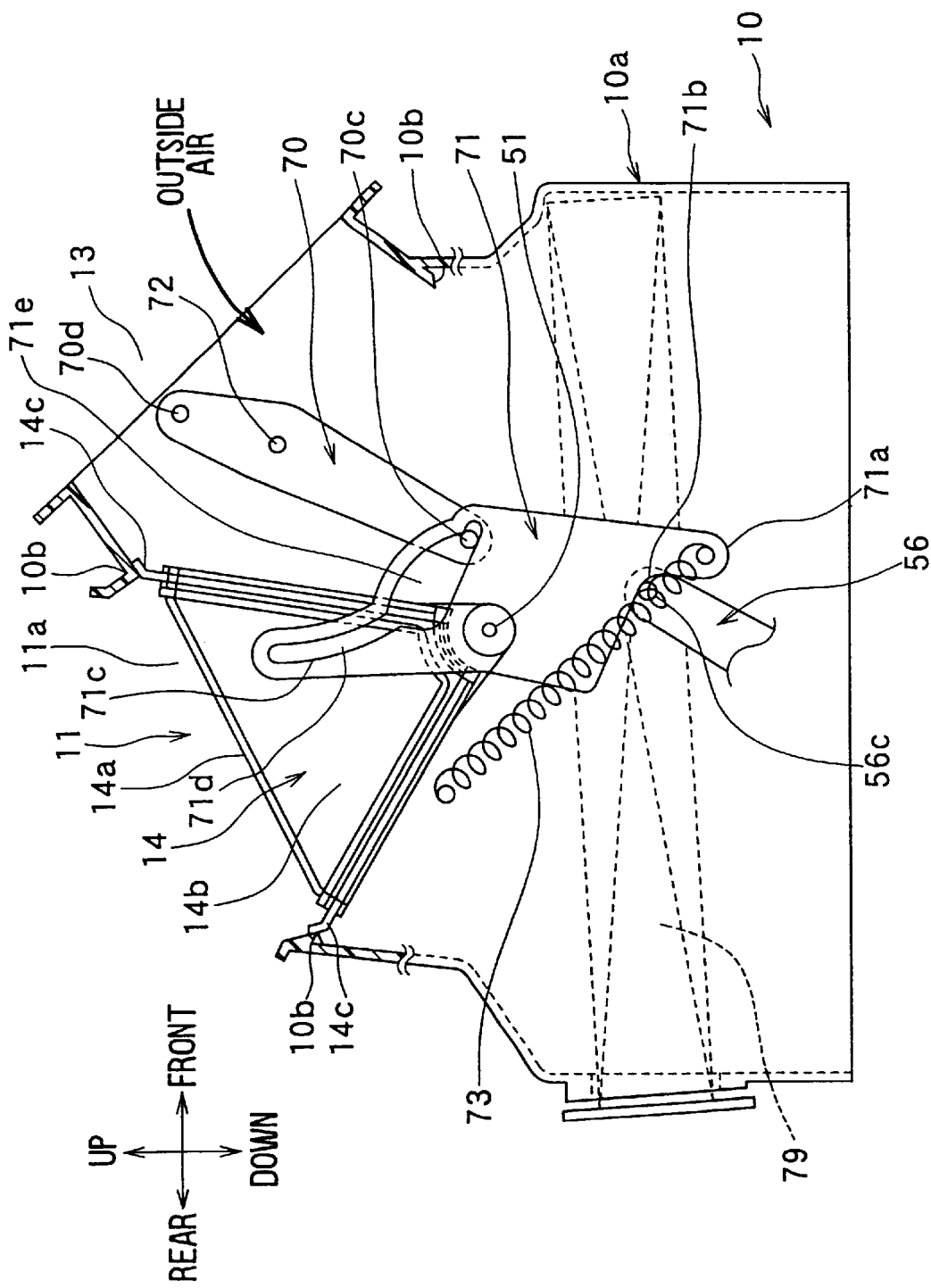
FIG. 13 is a partially sectional view showing an operation position of a link lever system when an outside air introduction mode is set during a defroster mode, according to the third embodiment.
Figure 14:
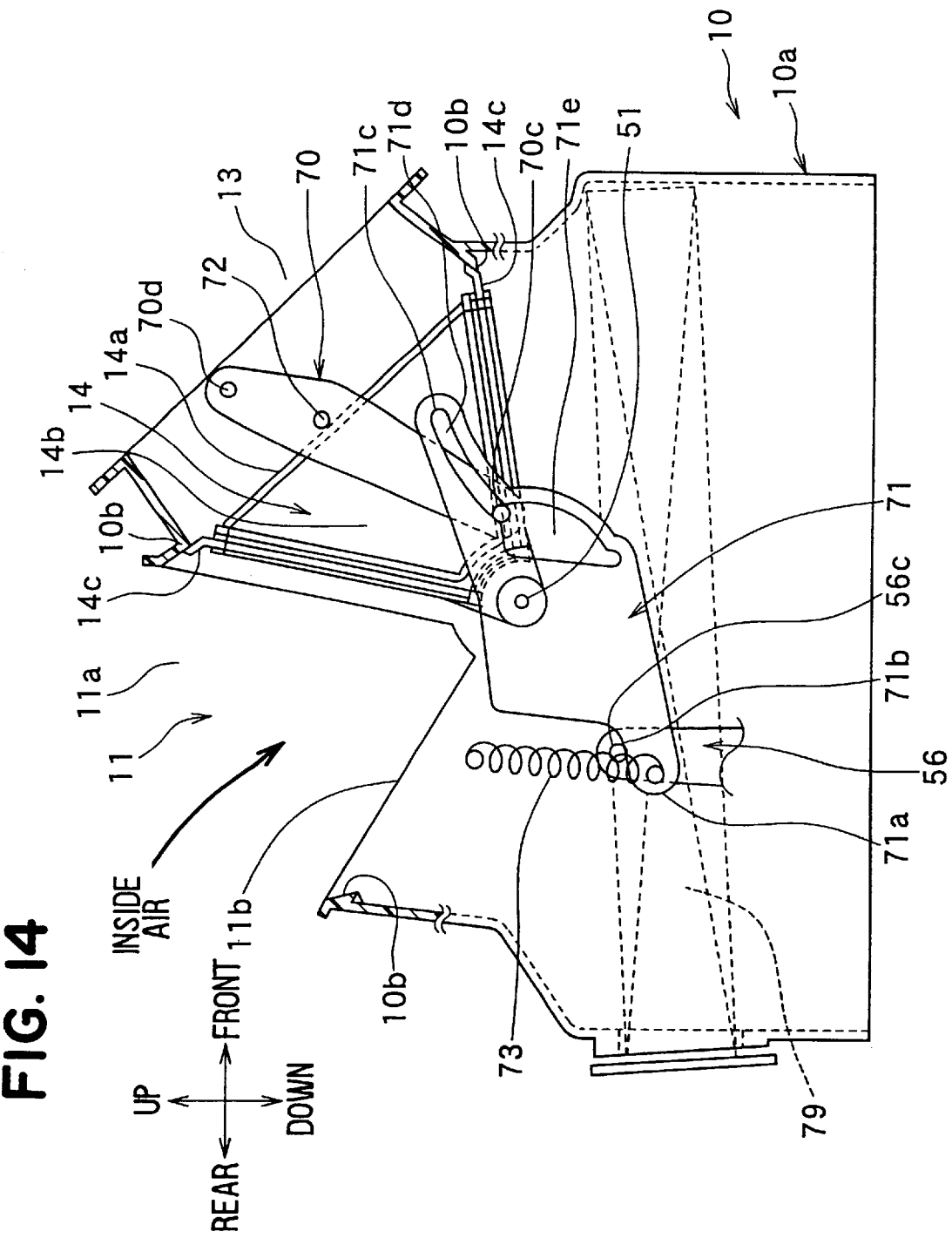
FIG. 14 is a partially sectional view showing an operation position of the link lever system when an inside air introduction mode is set during a foot mode, according to the is third embodiment.
Figure 15:
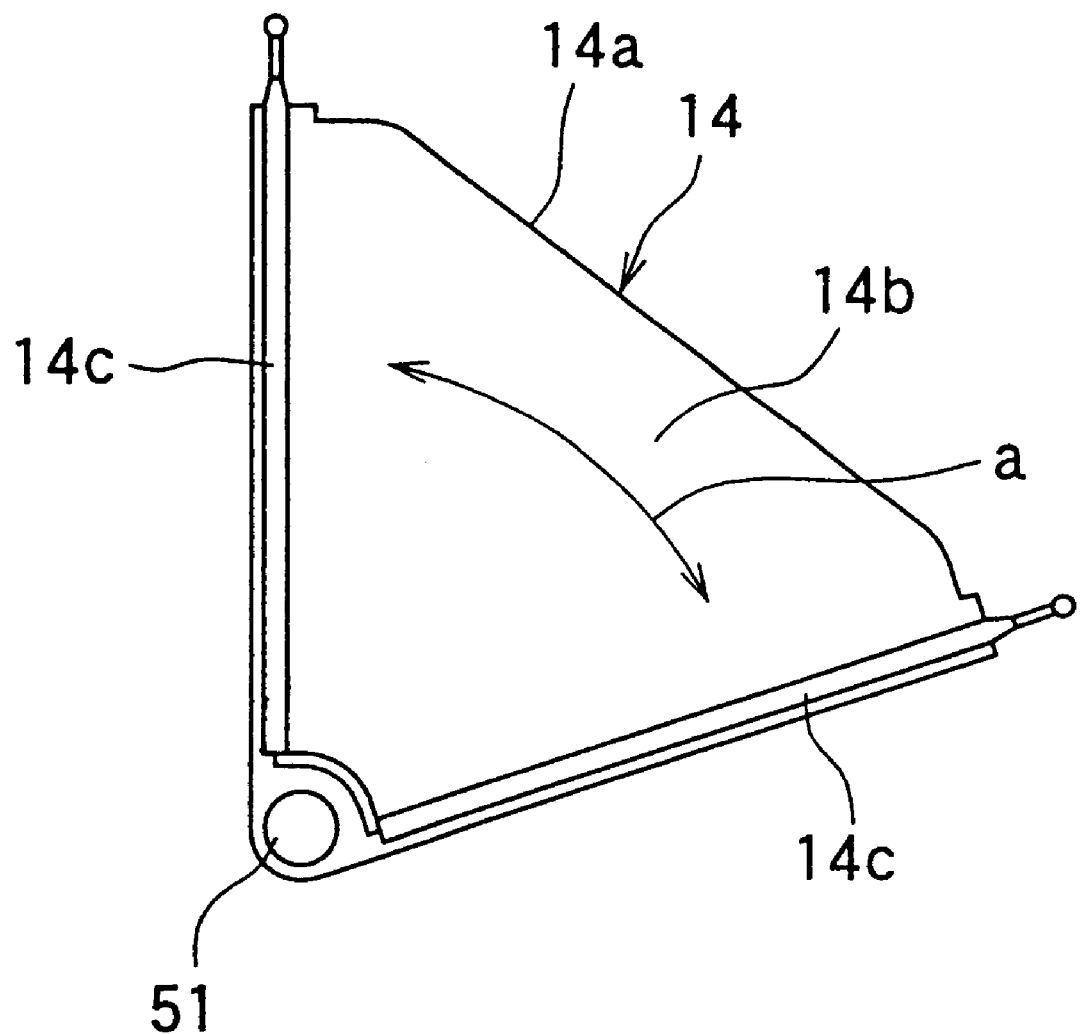
FIG. 15 is a side view of a rotary-type inside/outside air switching door according to the third embodiment.

Because the inside air introduction port 11 is opened and closed by the outer peripheral surface 14a and the side plates 14b of the inside/outside air switching door 14, the inside air introduction port 11 has an opening 11a opened in a surface of the blower case 10a at a vehicle rear side position, and both openings 11b positioned on both side surfaces of the blower case 10a in a vehicle right-left direction (i.e., paper face-back direction in FIGS. 13, 14). Thus, the inside air introduction port 11 has a opening shape opened at a position corresponding to the outer peripheral surface 14a of the inside/outside air switching door 14 and opened at positions corresponding to the side plates 14b of the inside/outside air switching door 14. As a result, during an inside air introduction mode, an opening area of the inside air introduction port 11 is increased. On the other hand, the outside air introduction port 13 has a rectangular flat shape.

The rotation shaft 51 protrudes from the side plates 14b of the inside/outside air switching door 14 in the axial direction, and both ends of the rotation shaft 51 are rotatably held in shaft bearings (not shown) of the blower case 10a. One end of the rotation shaft 51 of the inside/outside air switching door 14 protrudes to an outside from the blower case 10a, and is connected to the link lever system of the third embodiment.

In the inside/outside air switching door 14, because an inner space between the outer peripheral surface 14a and both the fan-like side plates 14b is opened to an outside, air can flows through the inner space. The inside/outside air switching door 14 including the outer peripheral surface 14a, the side plates 14b and the rotation shaft 51 is integrally molded using resin such as polypropylene.

A seal structure of the inside/outside air switching door 14 is a lip-seal type for decreasing operation force. That is, a lip-like (thin plate like) elastic seal member 14c is provided at peripheral surfaces of the outer peripheral surface 14a and the side plates 14b.

On the other hand, bank portions 10b protruding toward the inside/outside air switching door 14 are formed at peripheral portions of the inside air introduction port 11 and the outside air introduction port 13. The elastic seal members 14c contact the bank portions 10 while being elastically deformed. The bank portions 10b are integrally to formed with the blower case 10a made of resin.

Next, the link lever system for driving the inside/outside air switching door 14 is described. An input door lever 70 is rotated around a rotation shaft 72. A pin 70d is provided at one end of the input door lever 70, and the cable 53 (FIG. 2) is connected to the pin 70d. A mode operation lever 56 is rotated around a rotation shaft and is connected to the cable 60 (FIG. 2).

An output door lever 71 is connected to the rotation shaft 51 of the inside/outside air switching door 14 to be integrally rotated with the inside/outside air switching door 14. The output door lever 71 is operated based on displacements of the input door lever 70 and the mode operation lever 56.

A pin 70c is provided at the other end of the input door lever 70, and is slidably inserted in a cam recess portion 71c of the output door lever 71. A spring is connected to a protrusion 71a of the output door lever 71. By the spring force of the spring 73, a rotation force in the clockwise direction is applied to the output door lever 71.

On the other hand, a pin 56c at the one end portion of the mode operation lever 56 is disposed to press-contact a recess portion 71b of the output door lever 71. FIG. 13 shows the link lever system during the defroster mode (DEF). During the defroster mode, the pin 56c of the mode operation lever 56 press-contacts the recess portion 71b of the output door lever 71 so that the output door lever 71 is set at the position shown by the solid line in FIG. 13. At this time, the spring 73 is extended to be tensed, and the spring force of the spring 73 is applied to the press-contact portion so that the defroster mode position of the output door lever 71 is maintained. Therefore, during the defroster mode, the inside/outside air switching door 14 is forcibly operated to the outside air introduction position where the outside air introduction port 13 is opened and the inside air introduction port 11 is closed.

As shown by the right side parts in FIGS. 11, 12, the outside air introduction position of the input door lever 70 is approximately horizontal. Even when the input door lever 70 is rotated from the outside air introduction position approximately horizontally in the counterclockwise direction to an inside air introduction position shown in FIG. 13, the pin 70c of the input door lever 70 only slides within the cam recess portion 71c of the output door lever 71. Therefore, the rotation of the input door lever 70 in the counterclockwise direction from the outside air introduction position does not displace the output door lever 71. That is, at this time, the input door lever 70 is in a movable idling state relative to the output door lever 71.

Thus, during the defroster mode, even when the inside/outside air operation member 64 of the air-conditioning operation panel 63 is manually operated by a passenger and the input door lever 70 is operated to the inside air introduction position, the output door lever 71 and the inside/outside air switching door 14 are maintained at the outside air introduction position shown in FIG. 13.

In the third embodiment, even during the foot/defroster mode (F/D), the output door lever 71 and the inside/outside air switching door 14 are forcibly set to the outside air introduction position, regardless of the manual operation position of the inside/outside air operation member 64 by a passenger. That is, during the defroster mode and the foot/defroster mode, the outside air introduction mode is forcibly set regardless of the manual operation position of the inside/outside air operation member 64. Therefore, during the defroster mode and the foot/defroster mode, the defrosting performance of the windshield is improved.

During each of the foot/defroster mode (F/D) and the foot mode (FOOT), air is blown from the defroster opening 42 and the foot openings 44, 50. However, during the foot mode, the air amount blown from the defroster opening 42 is relatively small as compared with the air amount blown the foot openings 44, 50. On the other hand, during the foot/defroster mode, the air amount blown from the defroster opening 42 is increased to be approximately equal to the air amount blown from the foot openings 44, 50. That is, because the foot/defroster mode is set for improving the defrosting performance of the windshield, the outside air introduction mode is forcibly set during the foot/defroster mode.

However, in the third embodiment, only during the defroster mode, the outside air introduction mode may be forcibly set regardless of the operation position of the inside/outside air operation member 64, similarly to the above-described second embodiment.

FIG. 14 shows the link lever system during the foot mode. In this case, because the pin 56c of the mode operation lever 56 is moved from the position shown in FIG. 13 in the counterclockwise direction, the position control of the output door lever 71 due to the mode operation lever 56 is released. Therefore, the output door lever 71 is moved by the spring force of the spring 73 at a position where the operation position is determined by the input door lever 70. During the foot mode in FIG. 14, because the input door lever 70 is positioned at the inside air introduction position, the output door lever 71 and the inside/outside air switching door 14 are operated to the inside air introduction position based on the operation position of the input door lever 70.

Next, the effect using the rotary-type inside/outside air switching door 14 is described. As described above, the inside/outside air switching door 14 is moved by the spring force of the spring 73 from the outside air introduction position shown in FIG. 13 to the inside air introduction position shown in FIG. 14. Therefore, if a plate-like door is used as the inside/outside air switching door 14, a spring force larger than a travelling dynamical pressure is necessary when the travelling dynamical pressure is applied to the inside/outside air switching door 14. Conversely, when the inside/outside air switching door 14 is moved from the inside air introduction position shown in FIG. 14 to the outside air introduction position shown in FIG. 13, a manual operation force of the passenger is necessary to be increased because the spring force of the spring 73 becomes larger.

However, according to the third embodiment of the present invention, the inside/outside air switching door 14 is a rotary door. Therefore, a travelling dynamical pressure is applied to the inside/outside air switching door 14 in a direction approximately perpendicular to the door rotation direction, and the travelling dynamical force does not directly interrupt the rotation of the inside/outside air switching door 14. As a result, even when the spring force of the spring 73 is made smaller, the operation of the inside/outside air switching door 14 is accurately controlled.

According to the third embodiment, even when the spring 73 is damaged and the spring force of the spring 73 is not applied to the output door lever 71, the inside/outside air switching door 14 is maintained at the outside air introduction position. Therefore, even in this case, the defroster performance of the windshield can be maintained, and the security of the vehicle is improved.

In the third embodiment of the present invention, the outer peripheral surface 14a of the inside/outside air switching door 14 is formed into a flat shape. However, the outer peripheral surface 14a of the inside/outside air switching door 14 may be formed into a circular arc shape using the rotation shaft 51 as a rotation center.

Figure 16:
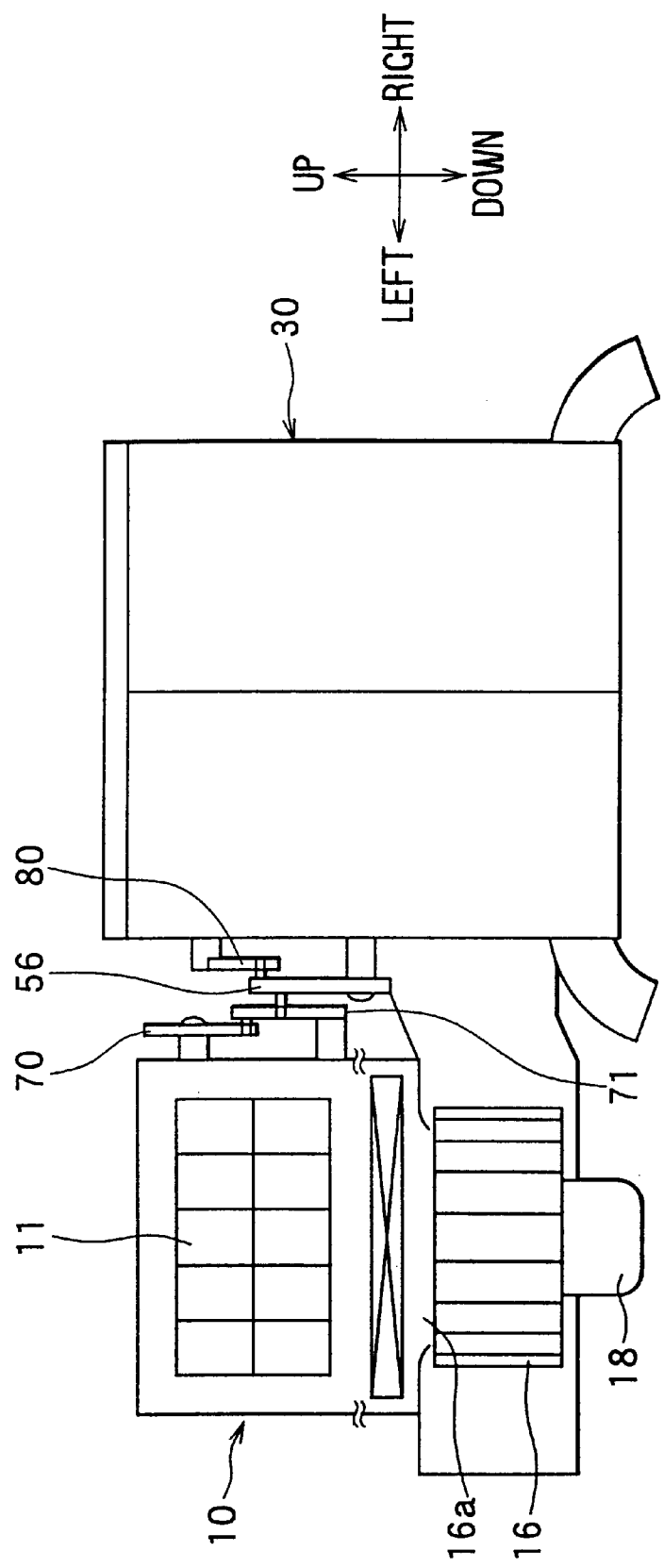
FIG. 16 is a schematic view showing an arrangement position of a link lever system according to a fourth preferred embodiment of the present invention.

A fourth preferred embodiment of the present invention will be now described with reference to FIG. 16. In the fourth embodiment, as shown in FIG. 16, a link lever system of the inside/outside air switching door 14 is disposed between the air-conditioning unit 30 and the blower unit 10. Here, the air-conditioning unit 30 is disposed approximately center portion in the vehicle right-left direction, and the blower unit 10 is offset to a vehicle left side from the air-conditioning unit 30.

As shown in FIG. 16, the mode operation lever 56 is disposed at a position proximate to both an output door lever 71 connected to the inside/outside air switching door 14 and an air outlet mode lever 80 connected to the mode switching doors 47, 48, 49. Therefore, the mode operation lever 56 is used in common for driving the inside/outside air switching door 14 of the blower unit 10 and for driving the mode switching doors 47, 48, 49. Thus, the link lever system of the fourth embodiment can be made simple.

Figures 17, 18:
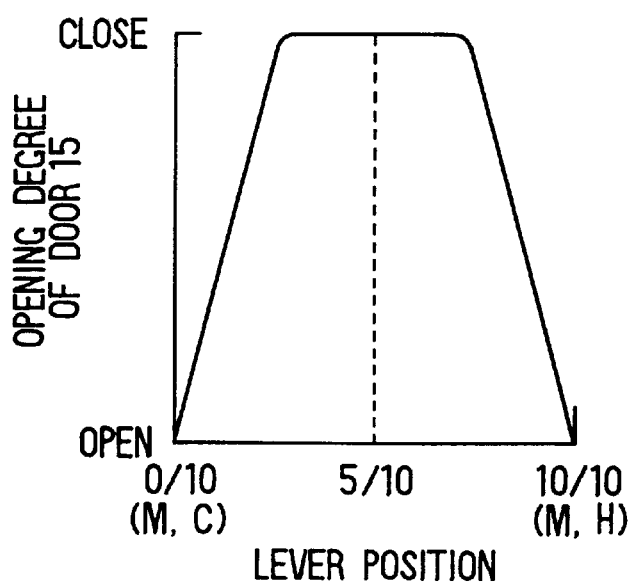
FIG. 17 is a view showing the relationship between an air outlet mode, an operation position of a temperature-adjustment operation member and an operation state of a second inside/outside air switching door according to a fifth preferred embodiment of the present invention.
FIG. 18 is a graph showing the relationship between an opening degree of the second inside/outside air switching door and a lever position of a temperature-adjustment operation lever according to the fifth embodiment.

A fifth preferred embodiment of the present invention will be now described with reference to FIGS. 17–21. The fifth embodiment of the present invention is a modification of the first embodiment. In the fifth embodiment, the components similar to those in the above-described first embodiment are indicated with the same reference number. FIG. 17 shows an opening/closing state of the second inside air introduction port 12 due to the second inside/outside air switching door 15. It is compared with FIG. 8 described in the first embodiment, in the fifth embodiment, during both the maximum cooling and maximum heating when an air outlet mode except for the defroster mode is set, the second inside/outside air switching door 15 is operated to the opening position of the second inside air introduction port 12. Therefore, during the maximum cooling, the second inside air introduction port 12 is opened, and cooling capacity for the passenger compartment is improved.

Thus, in the fifth embodiment, the link lever system of the first embodiment is changed as described later. That is, as shown in FIG. 18, the link lever system is constructed so that the second inside/outside air switching door 15 is operated to the opening position of the second inside air introduction port 12 at both maximum heating position (10/10 position) and the maximum cooling position (0/10) among the rotation range (0/10–10/10) of the temperature-adjustment operation lever 57.

Figure 19:
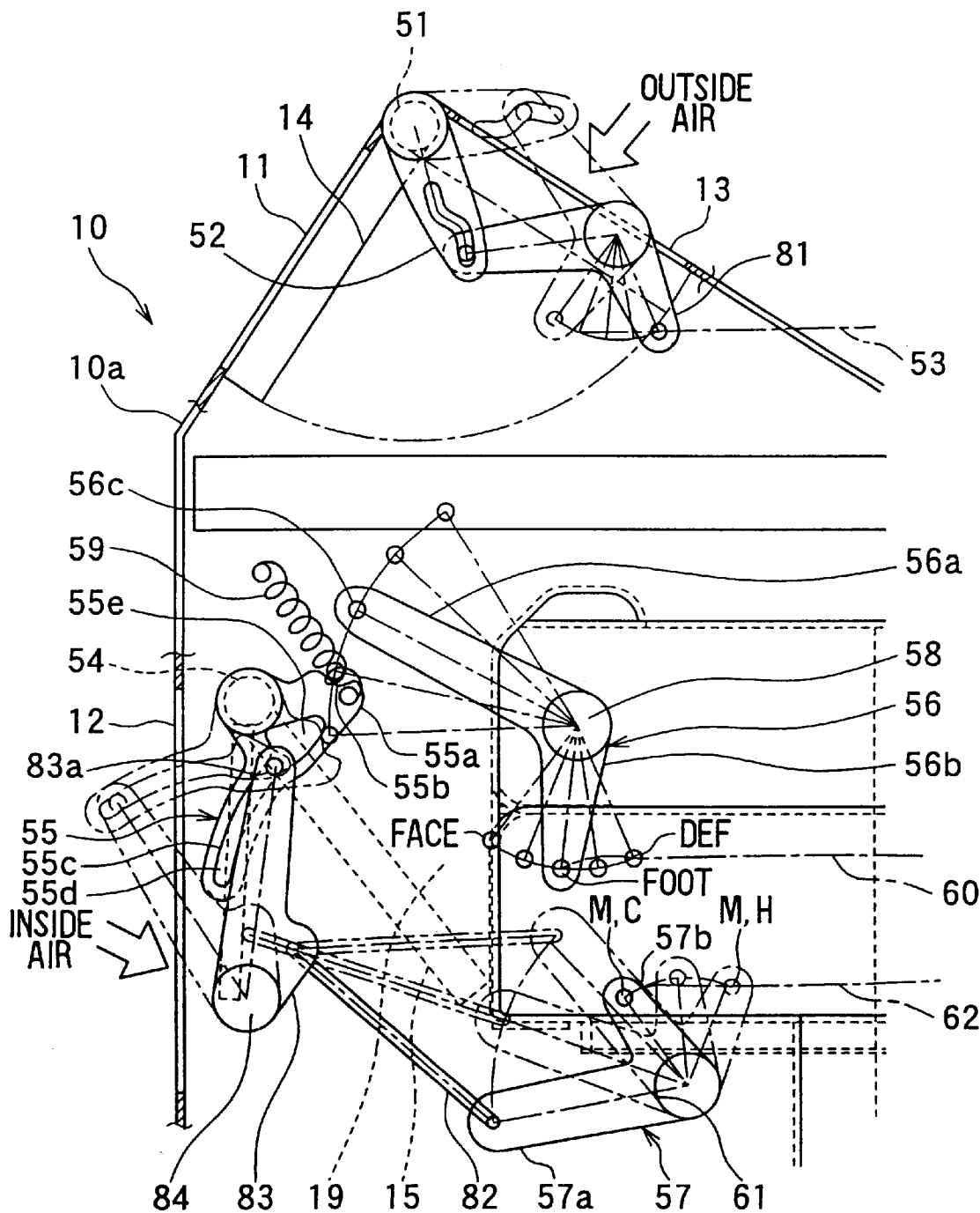
FIG. 19 is a front view showing a blower unit having a link lever system when a maximum cooling is set during a foot mode, according to the fifth embodiment.
Figure 20:
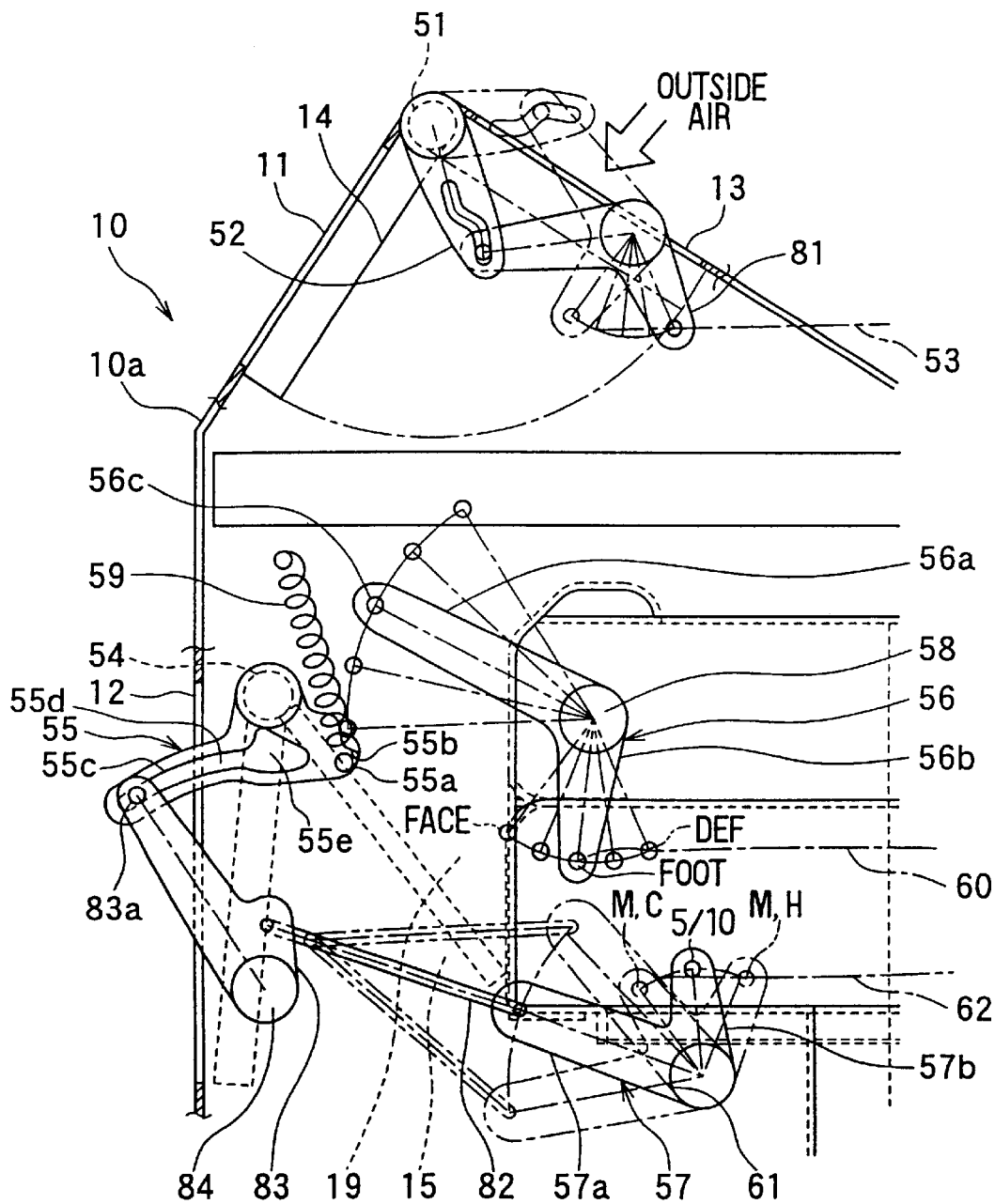
FIG. 20 is a front view showing the blower unit having the link lever system when a middle temperature control area is set during the foot mode, according to the fifth embodiment.
Figure 21:
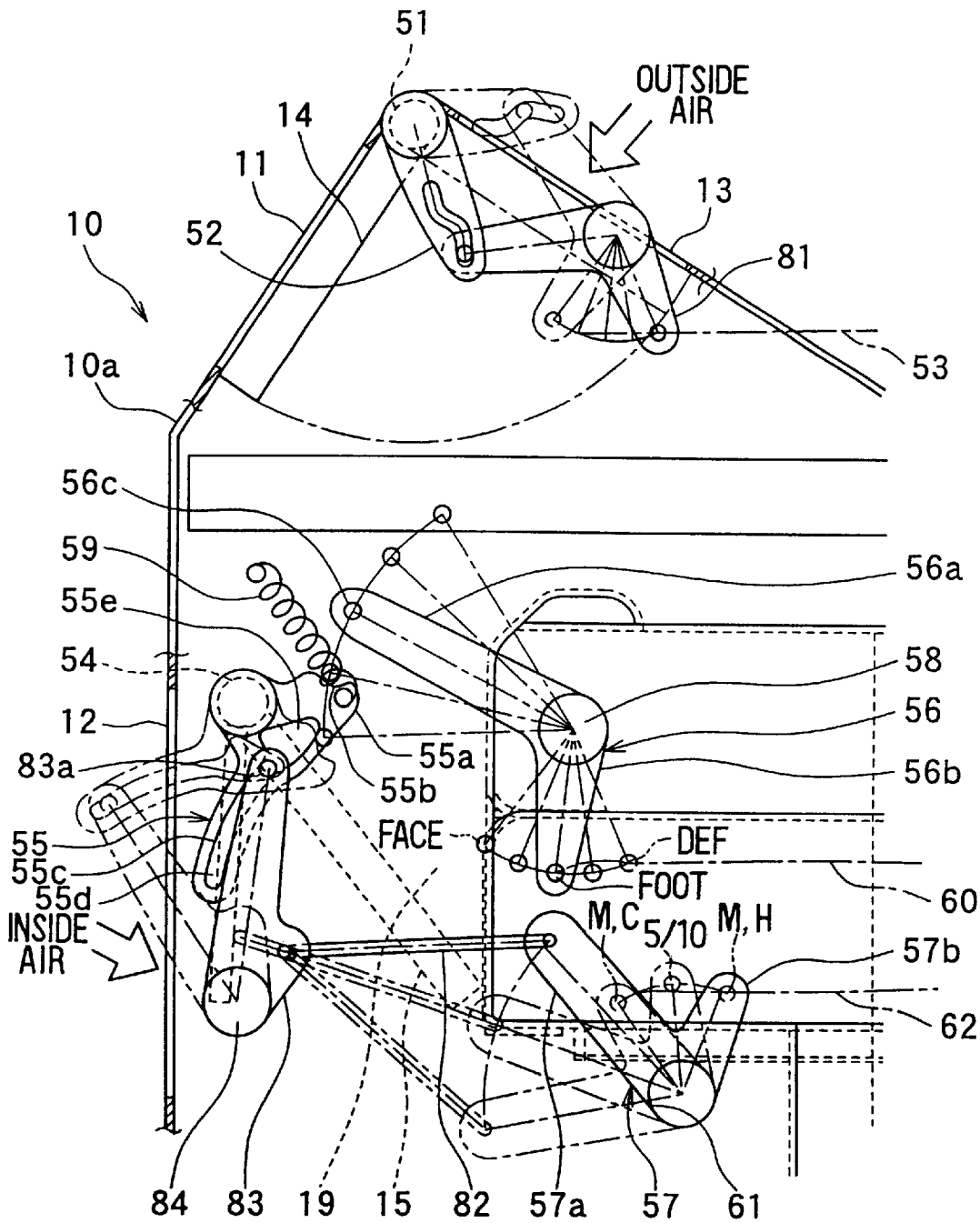
FIG. 21 is a front view showing the blower unit having the link lever system when a maximum heating is set during the foot mode, according to the fifth embodiment.

FIGS. 19–21 shows operations of the link lever system according to the fifth embodiment. In FIGS. 19–21, the same portions with those in FIGS. 4–7 are indicated with the same reference numbers. In the fifth embodiment, the first door lever 52 connected to the first inside/outside air switching door 14 is driven by the cable 53 through a supplementary lever 81. In FIGS. 19–21, the inside/outside air operation member 64 (FIG. 3) is operated so that the first inside/outside air switching door 14 closes the first inside air introduction port 11 and opens the outside air introduction port 13. The mode operation lever 56 is similar to that in FIGS. 4–7. In FIGS. 19–21, the mode operation lever 56 is operated to a foot mode position.

Further, the second door lever 55 and the spring 59 are similar to those in FIGS. 4–7. However, in the fifth embodiment, the second door lever 55 is not directly connected to the temperature-adjustment operation lever 57. That is, the second door lever 55 and the temperature-adjustment operation lever 57 are connected through a connection rod 82 and a connection lever 83. Specifically, a pin 83a disposed at a top end portion of the connection lever 83 is slidably inserted into the cam recess portion 55c of the second door lever 55. The connection lever 83 is disposed to be rotatable around a rotation shaft 84.

FIG. 19 shows the link lever system when the temperature-adjustment operation member 67 (FIG. 3) is operated to the maximum cooling position M. C (0/10 position), when the outside air introduction position is manually set by the inside/outside air operation member 64 (FIG. 3) during the foot mode. In this case, the temperature-adjustment operation lever 57 is rotated to the position shown by the solid line in FIG. 19. With the operation of the temperature-adjustment operation lever 57, the second door lever 55 is operated to the position in FIG. 19 through the connection rod 82 and the connection lever 83. Therefore, the second inside/outside air switching door 15 is operated to the opening position of the second inside air introduction port 12 (i.e., the closing position of the communication path 19).

FIG. 20 shows the link lever system when the temperature-adjustment operation member 67 (FIG. 3) is operated to a position between the maximum cooling position M. C (0/10 position) and the maximum heating position M. H (10/10 position), when the outside air introduction position is manually set by the inside/outside air operation member 64 (FIG. 3) during the foot mode. In this case, the temperature-adjustment operation lever 57 is rotated from the position shown in FIG. 19 in the clockwise direction by a predetermined angle. With the rotation operation of the temperature-adjustment operation lever 57, the second door lever 55 is rotated from the position in FIG. 19 to the position in FIG. 20 in the clockwise direction by a predetermined angle, through the connection rod 82 and the connection lever 83. Thus, the second inside/outside air switching door 15 is moved to the closing position of the second inside air introduction port 12 (i.e., the opening position of the communication path 19).

FIG. 21 shows- the link lever system when the temperature-adjustment operation member 67 (FIG. 3) is operated to the maximum heating position M. H (10/10 position), when the outside air introduction position is manually set by the inside/outside air operation member 64 (FIG. 3) during the foot mode. In this case, the temperature-adjustment operation lever 57 is further rotated from the position in FIG. 20 in the clockwise direction by a predetermined angle. With the operation of the temperature-adjustment operation lever 57, the second door lever 55 is also rotated in the clockwise direction from the position in FIG. 20 to the position in FIG. 21 through the connection rod 82 and the connection lever 83. Thus, the second inside/outside air switching door 15 is returned to the same state as FIG. 19. Therefore, the second inside/outside air switching door 15 opens the second air introduction port 12 and closes the communication path 19. As shown in FIGS. 19–21, the second inside/outside air switching door 15 can perform the operations shown in FIG. 18.

Although the present invention has been fully described in connection with the preferred embodiments thereof with reference to the accompanying drawings, it is to be noted that various changes and modifications will become apparent to those skilled in the art.

For example, in the vehicle air conditioner of the above-described embodiments, the ratio between the air amount of warm air heated in the heater core 33 and the air amount of cool air bypassing the heater core 33 is adjusted by the first and second air mixing doors 36, 37 so that the temperature of air blown into the passenger compartment is adjusted. However, the present invention may be applied to a vehicle air conditioner in which a flow amount or the temperature of hot water circulating into the heater core 33 is adjusted by a hot water valve and the temperature of air blown into the passenger compartment is adjusted by adjusting the opening degree of the hot water valve.

In the above-described embodiments, the doors 14, 15, 36, 37, 41, 47–49 are plate-like doors; however, may be constructed by film-like doors.

Further, the link lever system of the present invention may be used as an operation mechanism for driving a driven member for the other use.

Such changes and modifications are to be understood as being within the scope of the present invention as defined by the appended claims.

What is claimed is:

1. A link lever system comprising:
   a plurality of input levers which are respectively manually operated, said input levers including first and second input levers;
   an output lever operatively linked with said input levers, said output lever being operated by said input levers;
   an elastic member for applying an elastic force to said output lever; and
   first engagement means between said first input lever and said output lever;
   a driven member connected to said output lever to be operated by said output lever, wherein:
      said output lever is operated to a first predetermined position when said input levers are operated to set operation positions satisfying a predetermined condition;
      said output lever is operated to a second predetermined position while a displacement of said output lever due to the elastic force of said electric member is prevented by said first engagement means, when said first input lever is operated at an operation position different from said set operation position of said predetermined condition; and
      said first engagement means is provided in such a manner that said output lever is operated only to said first predetermined position and said second predetermined position.

2. The link lever system according to claim 1, further comprising:
   second engagement means between said second input lever and said output lever,
   wherein said output lever is operated to the second predetermined position while a displacement of said output lever due to the elastic force of said elastic member is prevented by said second engagement means, when said second input lever is operated at an operation position different from said set operation position of said predetermined condition.

3. The link lever system according to claim 2, wherein said first engagement means and said second engagement means are provided in such a manner that said output lever is operated only to said first predetermined position and said second predetermined position.

4. A link lever system comprising:
a plurality of input levers which are respectively manually operated, said plurality of input levers including first and second input levers;
an output lever operatively lined with said input levers, said output lever being operated by said input levers;
a driven member connected to said output lever to be operated by said output lever;
an elastic member for applying an elastic force to said output lever; and
first engagement means between said first input lever and said output lever; wherein:
said output lever is operated to a first predetermined position when said input levers are operated to set operation positions satisfying a predetermined condition;
said output lever is operated to a second predetermined position while a displacement of said output lever due to the elastic force of said electric member is prevented by said first engagement means, when said first input lever is operated at an operation position different from said set operation position of said predetermined condition;
said first input lever includes a pin at one end side;
said output lever has a recess surface on which said pin of said first input lever contacts; and
said first engagement means is constructed by a contact between said pin of said first input lever and said recess surface of said output lever.

5. A link lever system comprising:
a plurality of input levers which are respectively manually operated, said plurality of input levers including first and second input levers;
an output lever operatively lined with said input levers, said output lever being operated by said input levers;
a driven member connected to said output lever to be operated by said output lever;
an elastic member for applying an elastic force to said output lever;
first engagement means between said first input lever and said output lever; and
second engagement means between said second input lever and said output lever; wherein:
said output lever is operated to a first predetermined position when said input levers are operated to set operation positions satisfying a predetermined condition;
said output lever is operated to a second predetermined position while a displacement of said output lever due to the elastic force of said electric member is prevented by said first engagement means, when said first input lever is operated at an operation position different from said set operation position of said predetermined condition;
said output lever is operated to the second predetermined position while a displacement of said output lever due to the elastic force of said elastic member is prevented by second engagement means, when said second input lever is operated at an operation position different from said set operation position of said predetermined condition;
said second input lever has a pin at one end side;
said output lever has therein a recess portion into which said pin of said second input lever is engage;
said recess portion of said output lever includes:
an idling recess having a shape corresponding to a rotation locus of said pin of said second input lever, and being provided in a range in which said second input lever operates to a position different from said set operation position of said predetermined condition, and
an enlarged recess having a first enlarged wall surface expanding to an outside from said rotation locus, and being provided in a range in which said second input lever operates to said set operation position of said predetermined condition; and
said second engagement means is constructed by an engagement between said pin of said second input lever and said idling recess of said out put lever.

6. The link lever system according to claim 5, further comprising:
third engagement means between said second input lever and said output lever, wherein:
said enlarged recess has a second enlarged wall surface expanding to an outside from said rotation locus opposite to said first enlarged wall surface;
said third engagement means is constructed by an engagement between said pin of said second input lever and said second enlarged wall surface of said enlarged wall; and
said third engagement means is provided to displace said output lever with a displacement of said first input lever while said second input lever is maintained at said set operation position of said predetermined condition.

7. The link lever system according to claim 6, wherein:
said output lever is rotatable around a rotation shaft; and
said second enlarged wall surface has a circular arc shape using said rotation shaft of said output lever as a center.

8. A link lever system comprising:
at least first and second input levers which are respectively manually operated;
an output lever operatively linked with said input levers, said output lever being operated by said input levers;
a driven member connected to said output lever to be operated by said output lever;
an elastic member for applying an elastic force to said output lever; and
engagement means between said second input lever and said output lever; wherein:
said output lever is operated to a first predetermined position when said input levers are operated to set operation positions satisfying a predetermined condition;
said output lever is operated to a second predetermined position while a displacement of said output lever due to the elastic force of said electric member is prevented by said engagement means, when said second input lever is operated at an operation position different from said set operation position of said predetermined condition;
said second input lever has a pin at one end side;
said output lever has therein a recess portion into which said pin of said second input lever is engaged;
said recess portion of said output lever includes:
an idling recess having a shape corresponding to a rotation locus of said pin of said second input lever, and being provided in a range in which said second input lever operates to a position different from said set operation position of said predetermined condition, and an enlarged recess having a first enlarged wall surface expanding to an outside from said rotation locus, and being provided in a range in which said second input lever operates to said set operation position of said predetermined condition; and said engagement means is constructed by an engagement between said pin of said second input lever and said idling recess of said output lever.

* * * * *